(12) United States Patent
Petrak

(10) Patent No.: US 8,336,887 B2
(45) Date of Patent: Dec. 25, 2012

(54) SEAL ASSEMBLY

(76) Inventor: Gregory H. Petrak, Golden, CO (US)

( * ) Notice: Subject to any disclaimer, the term of this patent is extended or adjusted under 35 U.S.C. 154(b) by 1174 days.

(21) Appl. No.: 11/743,575

(22) Filed: May 2, 2007

(65) Prior Publication Data

US 2007/0257447 A1 Nov. 8, 2007

Related U.S. Application Data

(60) Provisional application No. 60/746,249, filed on May 2, 2006.

(51) Int. Cl.
F16J 15/32 (2006.01)
(52) U.S. Cl. ............ 277/577; 277/553; 277/572
(58) Field of Classification Search .......... 277/549, 277/551, 553, 572, 577
See application file for complete search history.

(56) References Cited

U.S. PATENT DOCUMENTS

| | | | |
|---|---|---|---|
| 2,181,203 A * | 11/1939 | Reynolds | 277/504 |
| 2,294,105 A | 8/1942 | Wallgren | |
| 2,399,764 A | 5/1946 | Schilling | |
| 2,479,968 A | 8/1949 | Schick | |
| 2,482,029 A | 9/1949 | Reynolds | |
| 2,498,739 A | 2/1950 | Magnesen | |
| 2,565,675 A | 8/1951 | Bottomley et al. | |
| 2,635,907 A | 4/1953 | Heimbuch | |
| 2,783,067 A | 2/1957 | Foss | |
| 2,868,562 A | 1/1959 | Heimbuch | |
| 2,881,015 A | 4/1959 | Wahl | |
| 2,926,938 A | 3/1960 | Ratti | |
| 2,994,547 A | 8/1961 | Dolhun et al. | |
| 3,022,081 A * | 2/1962 | Kosatka | 277/353 |
| 3,120,959 A | 2/1964 | Jensen et al. | |
| 3,311,430 A | 3/1967 | Christensen et al. | |
| 3,326,559 A | 6/1967 | Persons | |
| 3,370,856 A | 2/1968 | Buske | |
| 3,479,840 A | 11/1969 | Meyers | |
| 3,495,843 A | 2/1970 | Anderson et al. | |
| 3,511,513 A | 5/1970 | Dahlheimer | |
| 3,536,332 A | 10/1970 | Pitner | |
| 3,561,770 A * | 2/1971 | Corsi et al. | 277/562 |
| 3,582,091 A | 6/1971 | Smith | |
| 3,606,363 A | 9/1971 | Jordan | |
| 3,623,738 A * | 11/1971 | MacDonnell | 277/356 |
| 3,642,335 A | 2/1972 | Takahashi et al. | |
| 3,727,923 A | 4/1973 | McEwen | |
| 3,761,099 A | 9/1973 | Hansson | |
| 3,813,102 A | 5/1974 | Derman | |

(Continued)

FOREIGN PATENT DOCUMENTS

AU 0124487 6/1947

(Continued)

*Primary Examiner* — Gilbert Lee
(74) *Attorney, Agent, or Firm* — Dorsey & Whitney LLP

(57) ABSTRACT

A seal assembly disposed between relatively rotating members such as a rotating shaft passing through an opening in a stationary housing. The seal assembly may include a housing, such as a canister, and a seal member retained in the canister. The seal member may include an inner portion and an outer portion interconnected by a flexible wall and an aperture for receiving the shaft. The flexible wall may permit the inner portion to move relative to the outer portion of the seal member. The inner portion of the seal member may forms a seal with the shaft, and the seal member may rotate with the shaft within the canister. The seal assembly may engage an oil seal and may function as an excluder seal.

32 Claims, 14 Drawing Sheets

U.S. PATENT DOCUMENTS

| | | | |
|---|---|---|---|
| 3,822,890 A | 7/1974 | Bourgeois | |
| 4,171,819 A | 10/1979 | Martineau | |
| RE30,223 E | 3/1980 | Prescott et al. | |
| 4,212,473 A | 7/1980 | Arai | |
| 4,243,233 A | 1/1981 | Arai | |
| 4,251,082 A | 2/1981 | Little | |
| 4,275,890 A | 6/1981 | Reinsma | |
| 4,284,281 A | 8/1981 | Reinsma | |
| 4,311,315 A | 1/1982 | Kronenberg | |
| 4,376,541 A | 3/1983 | Walter et al. | |
| 4,377,312 A | 3/1983 | Zackrisson | |
| 4,427,202 A | 1/1984 | Backlin | |
| 4,428,586 A | 1/1984 | Romero | |
| 4,432,557 A * | 2/1984 | Drucktenhengst | 277/351 |
| 4,457,519 A | 7/1984 | Harrington | |
| 4,497,495 A | 2/1985 | Christiansen | |
| 4,502,698 A | 3/1985 | Collins | |
| 4,572,523 A | 2/1986 | Guettouche et al. | |
| 4,588,195 A | 5/1986 | Antonini et al. | |
| 4,763,905 A | 8/1988 | Zvonar | |
| 4,848,776 A | 7/1989 | Winckler | |
| 4,861,172 A | 8/1989 | Annast et al. | |
| 4,863,292 A | 9/1989 | Dreschmann et al. | |
| 4,928,979 A | 5/1990 | Nagasawa | |
| 4,943,068 A | 7/1990 | Hatch et al. | |
| 4,962,936 A | 10/1990 | Matsushima | |
| 4,968,044 A | 11/1990 | Petrak | |
| 5,015,001 A | 5/1991 | Jay | |
| 5,018,750 A | 5/1991 | Sparks et al. | |
| 5,096,207 A | 3/1992 | Seeh et al. | |
| 5,098,112 A | 3/1992 | Petrak | |
| 5,137,285 A | 8/1992 | Pick | |
| 5,147,139 A | 9/1992 | Lederman | |
| 5,183,269 A | 2/1993 | Black et al. | |
| 5,186,472 A | 2/1993 | Romero et al. | |
| 5,201,529 A | 4/1993 | Heinzen | |
| 5,269,536 A | 12/1993 | Matsushima et al. | |
| 5,348,312 A | 9/1994 | Johnston | |
| 5,421,592 A | 6/1995 | Petrak | |
| 5,522,600 A | 6/1996 | Duckwall | |
| RE35,309 E * | 8/1996 | Matsushima et al. | 277/351 |
| 5,655,781 A | 8/1997 | Petrak | |
| 5,687,972 A | 11/1997 | Petrak | |
| 5,713,579 A | 2/1998 | Petrak | |
| 6,450,503 B1 * | 9/2002 | Dossena et al. | 277/572 |
| 6,991,234 B2 * | 1/2006 | Oldenburg | 277/309 |
| 2004/0227303 A1 * | 11/2004 | Bock et al. | 277/549 |
| 2006/0012129 A1 * | 1/2006 | Oldenburg | 277/572 |

FOREIGN PATENT DOCUMENTS

| | | |
|---|---|---|
| CA | 464974 | 7/1946 |
| DE | 949790 | 3/1956 |
| DE | 1061144 | 7/1959 |
| DE | 2216815 | 11/1972 |
| DE | 2549465 | 5/1977 |
| DE | 3501906 | 9/1985 |
| FR | 1013310 | 4/1952 |
| FR | 1024718 | 1/1953 |
| FR | 1168769 | 3/1957 |
| GB | 230697 | 3/1925 |
| GB | 807140 | 1/1959 |
| GB | 1414408 | 11/1975 |
| WO | WO 90/11463 | 10/1990 |
| WO | WO 91/13277 | 9/1991 |

* cited by examiner

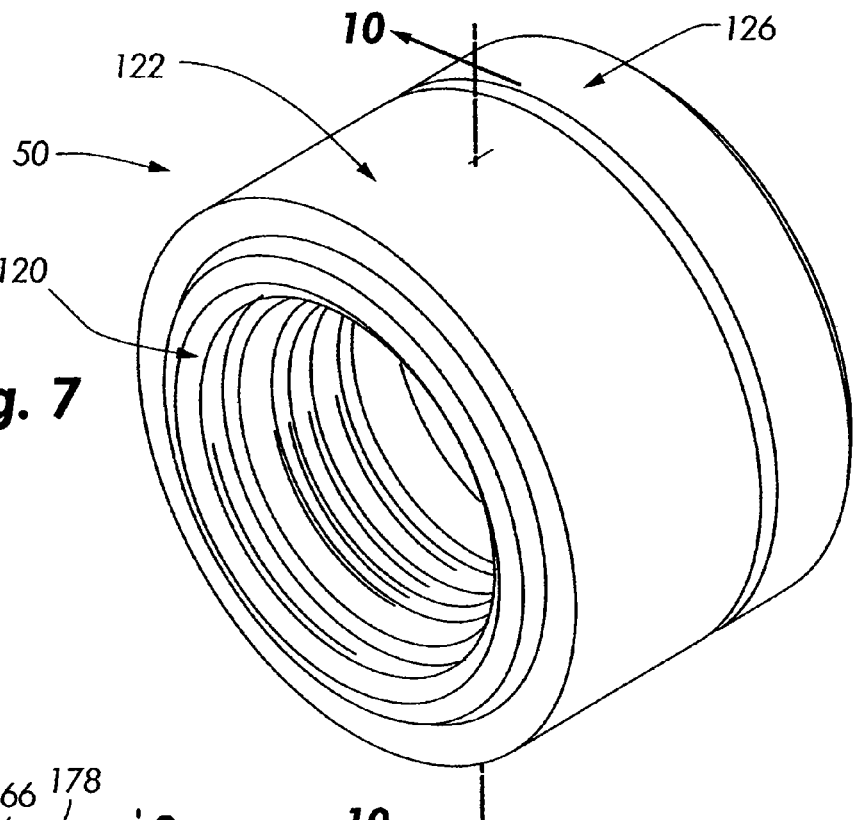
*Fig. 7*
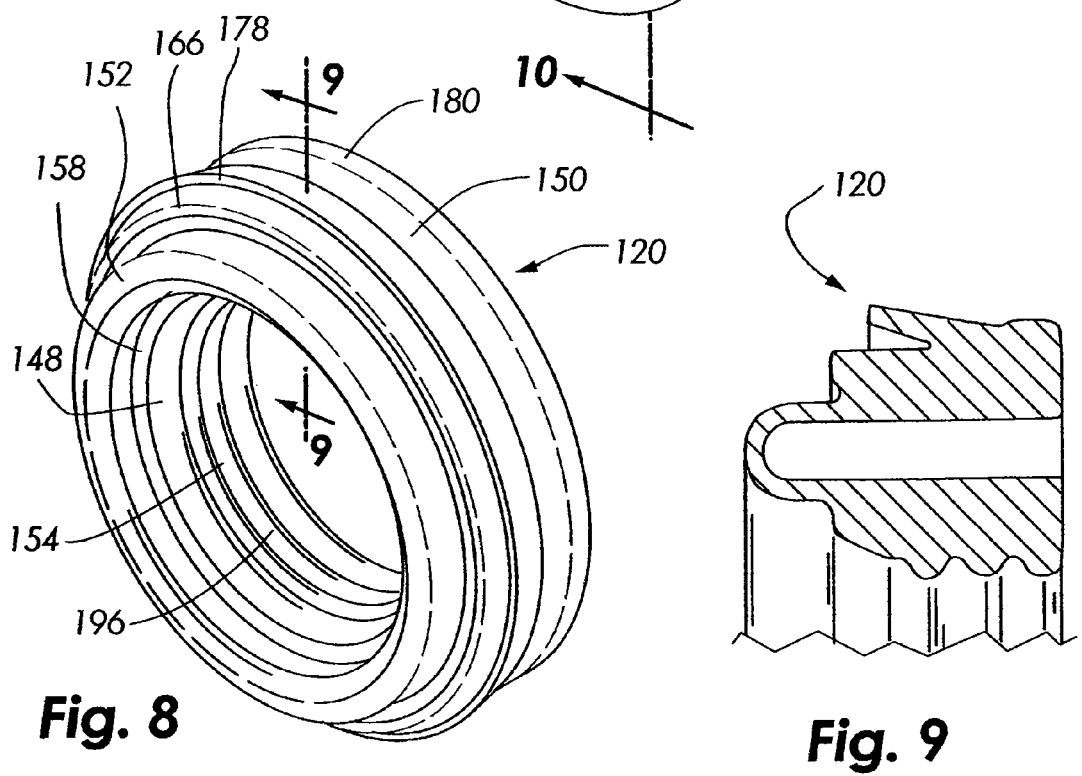
*Fig. 8*
*Fig. 9*

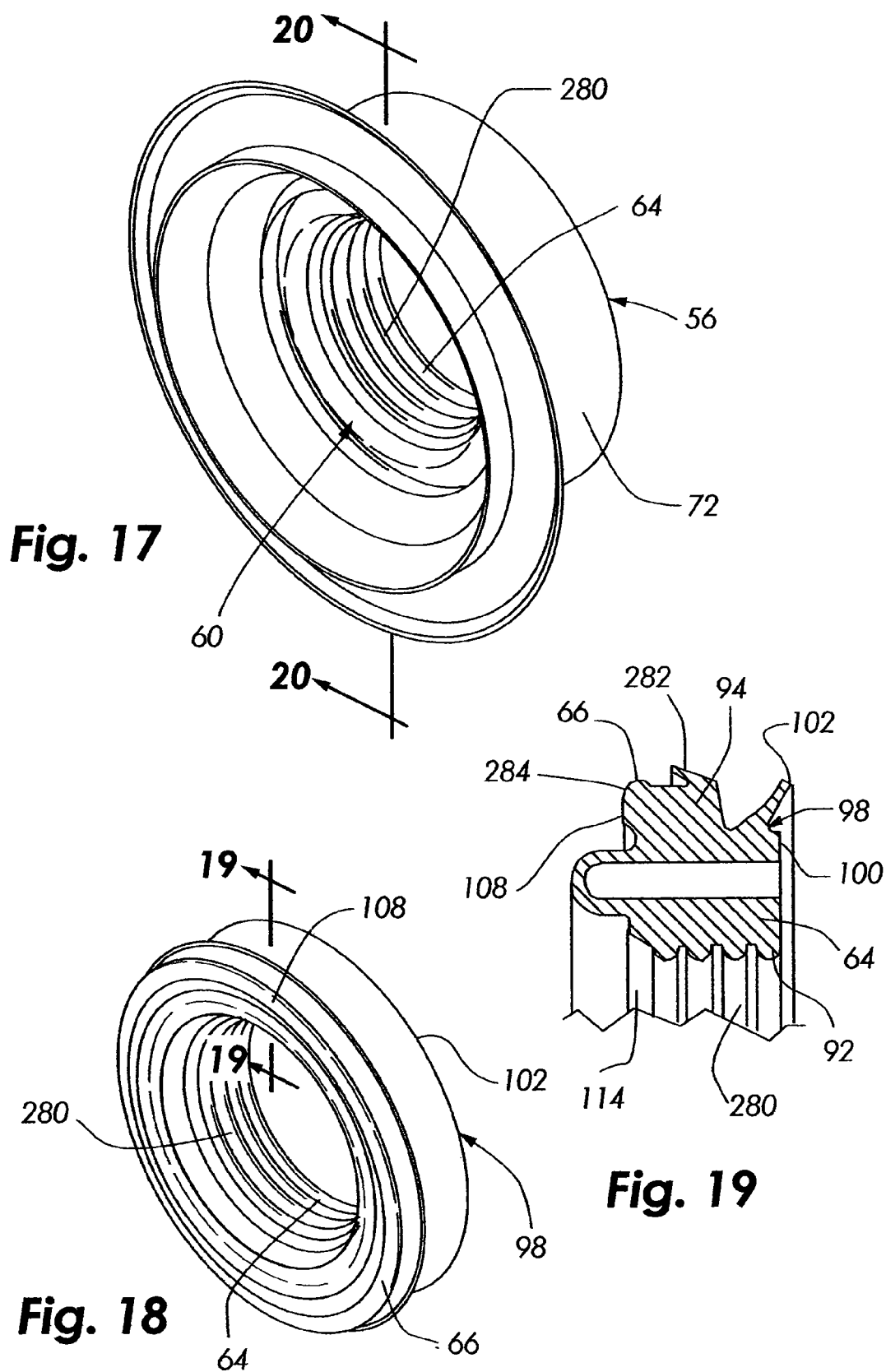

SEAL ASSEMBLY

CROSS-REFERENCE TO RELATED APPLICATIONS

This application claims under 35 U.S.C. §119(e) the benefit of U.S. Provisional Application No. 60/746,249, entitled "Seal Assembly" and filed May 2, 2006, which is hereby incorporated herein by reference in its entirety.

BACKGROUND OF THE INVENTION a. Field of the Invention

This invention relates to seals, and more particularly to a seal assembly disposed between relatively rotatable parts such as a stationary housing with a rotating shaft passing through the housing.

b. Background Art

In applications involving relatively rotating members such as a rotating shaft extending through a stationary housing, it may difficult to form an effective seal between the members, especially when one member moves relative to the other member in a direction parallel to an axis about which the members rotate. For example, in an application in which a rotating shaft passes through a stationary housing, it may necessary to seal oil within the housing and to prevent dirt or other contaminants from entering the housing. In such an application, a seal assembly may be used in which a seal is formed between an elastomeric element of the seal assembly and the rotating shaft. If, however, the rotating shaft moves axially relative to the elastomeric element as the shaft rotates about its axial axis, the seal between the elastomeric element and rotating shaft may fail. In particular, as the shaft moves axially outwardly relative to the elastomeric element, the shaft may collect dust and other abrasive particles. Then, as the shaft moves axially towards the elastomeric element, the dust and other abrasive particles may become trapped between the rotating shaft and elastomeric element and may also become embedded within the elastomeric element. As the shaft continues to rotate, the trapped and embedded abrasive material may score the shaft and the elastomeric element to such an extent that oil may eventually leak through the seal formed between the shaft and the elastomeric element.

Accordingly, what is needed in the art is an improved seal assembly for sealing relatively rotating members.

BRIEF SUMMARY

One example of the present invention may take the form of a seal assembly for radially spaced inner and outer members. The seal assembly may include a canister, a seal member, and a lid. The seal member may include an inner portion configured to form a seal with the inner member, an outer portion in sealed engagement with canister, and an intermediate portion connecting the outer portion to the inner portion and permitting relative movement between the outer portion and the inner portion in at least a first direction. The lid may be operatively associated with the canister to substantially prevent movement of the outer portion of the seal member in the first direction when the canister is operatively associated with the lid.

Another example of the present invention may take the form of a seal assembly for radially spaced inner and outer members. The seal assembly may include first and second members and a seal member. The seal member may include an inner portion configured to form a seal with the inner member, an outer portion in sealed engagement with the first member, and a flexible wall connecting the outer portion to the inner portion and permitting relative movement between the outer portion and the inner portion in at least a first direction. The second member may be operatively associated with the first member to substantially prevent movement of the outer portion of the seal member in the first direction.

Yet another example of the present invention may take the form of a method of forming a seal between radially spaced inner and outer members. The method may include providing a seal assembly and operatively associating the seal assembly with the inner and outer members. The seal assembly may include a seal member including an inner portion configured to form a seal with the inner member, an outer portion in sealed engagement with a first member, and an intermediate portion connecting the outer portion to the inner portion and permitting relative movement between the outer portion and the inner portion in a first direction. A second member may be operatively associated with the first member to substantially prevent movement of the outer portion of the seal member in the first direction when the first member is operatively associated with the second member.

Yet still another example of the present invention may take the form of a seal assembly for radially spaced inner and outer members. The seal assembly may include a canister, a seal member and a lid. The canister may include a sidewall with a flange extending from the sidewall and defining a canister hole. The seal member may include an inner portion configured to engage the inner member to form a seal between the inner portion and the inner member, an outer portion including a main body connected to a wiper section including a heel and a toe, and a flexible wall connecting the outer portion to the inner portion and permitting relative movement between the outer portion and the inner portion in at least a first direction. The lid may be operatively associated with the canister to substantially prevent movement of the outer portion of the seal member in the first direction relative to the canister and the lid. The toe may extend angularly from the heel and radially away from the inner portion of the seal member. The toe and the heel may form a sealed engagement with the flange of the canister. The flexible wall and the inner portion of the seal member may move relative to the canister and the lid in the first direction. The seal member may rotate within the canister.

Yet a further example of the present invention may take the form of a seal assembly for radially spaced inner and outer members. The seal assembly may include first and second seal assemblies. The first seal assembly may include a first housing and a first seal member. The first seal member may include an inner portion configured to engage the inner member, an outer portion in sealed engagement with the first housing, and an intermediate portion operably associating the outer portion with the inner portion and permitting relative movement between the outer portion and the inner portion in at least a first direction. The first housing may substantially restrict movement of the outer portion of the seal member relative to the first housing in the first direction. The second seal assembly may include a second housing and a second seal member. The second housing may be operably engaged with the first housing. The second seal member may be at least partially received in the second housing and may engage said inner member. The first housing and the second housing may be in engagement with one another.

In some forms of the foregoing example, a portion of the second housing may engage the first seal member. In yet other forms of the foregoing example, the first and second housings may each have a portion including a generally cylindrical shape, and the cylindrical shapes may engage one another in a press-fit arrangement. In still yet other forms of the foregoing example, the outer portion of the first seal member may include an annular seal extending radially therefrom and may engage the interior of the first housing. The annular seal may extend at angle generally toward the intermediate portion or at an angle generally away from the intermediate portion. In yet more forms of the foregoing example, the inner portion of the first seal member may define an inner radial surface including at least one annular ridge formed thereon. In still yet more forms of the foregoing example, the outer portion of the first seal member may define a bearing portion formed annularly around the outer portion. The bearing portion may engage with at least a portion of an inner surface of the first housing, and the first seal member may move together with the inner member and may move relative to the first housing. In still further forms of the foregoing example, the second housing may be contained within the first housing, and the first and second seal members may be positioned axially along the inner member. The inner member may be a rotating shaft, and the outer member may be a housing at least partially receiving the rotating shaft.

Yet another example of the present invention may take the form of a seal assembly for radially spaced inner and outer member. The seal assembly may include a first housing and a first seal member. The first seal member may include an inner portion configured to engage the inner member, an outer portion in sealed engagement with the first housing, and an intermediate portion operably associating the outer portion with the inner portion and permitting relative movement between the outer portion and the inner portion in at least a first direction. The first housing may substantially restrict movement of the outer portion of the seal member relative to the housing in the first direction.

In some forms of the yet another example, the outer portion of the first seal member may include an annular seal extending radially therefrom and may engage an interior of the first housing. The annular seal may extend at an angle generally toward the intermediate portion or at an angle generally away from the intermediate portion. In yet other forms of the yet another example, the inner portion of the first seal member may define an inner radial surface including at least one annular ridge formed thereon. In still yet other forms of the yet another example, the outer portion of the first seal member may define a bearing portion formed annularly around the outer portion. The bearing portion may be in engagement with at least a portion of an inner surface of the first housing. In yet more forms of the yet another example, the first seal member may move together with the inner member and may move relative to the first housing. In still yet more forms of the yet another example, the outer portion of the first seal member may include a wiper seal. The wiper seal may include a heel portion and a toe portion. The toe portion may engage an inner portion of the first housing. In still further forms of the yet another example, at least a portion of an axially inner portion of the outer portion may engage the first housing and a gap may be formed between the first housing and at least another portion of the outer portion.

In yet further forms of the yet another example, the seal assembly may include a second seal assembly. The second seal assembly may include a second housing and a second seal member. The second seal member may engage the inner member. The second housing may be engaged with the first housing to position the first seal member and the second seal member axially along the inner member. The second housing may be substantially contained within the first housing or may be entirely contained with the first housing. The second housing may at least partially engage at least a portion of the first seal member. The second housing may engage both the inner and outer portions of the first seal member.

BRIEF DESCRIPTION OF THE DRAWINGS

FIG. 7 is a perspective view of an example of the present invention, including a seal assembly.

FIG. 8 is a perspective view of the seal member used, for instance, in the example shown in FIG. 7.

FIG. 9 is a partial section view taken along line 9-9 of FIG. 8.

FIG. 17 is a perspective view of one example of the present invention, including a seal assembly.

FIG. 18 is a perspective view of the seal member used, for instance, in the example shown in FIG. 17.

FIG. 19 is a partial section view taken along line 19-19 of FIG. 18.

DETAILED DESCRIPTION

Figure 1:
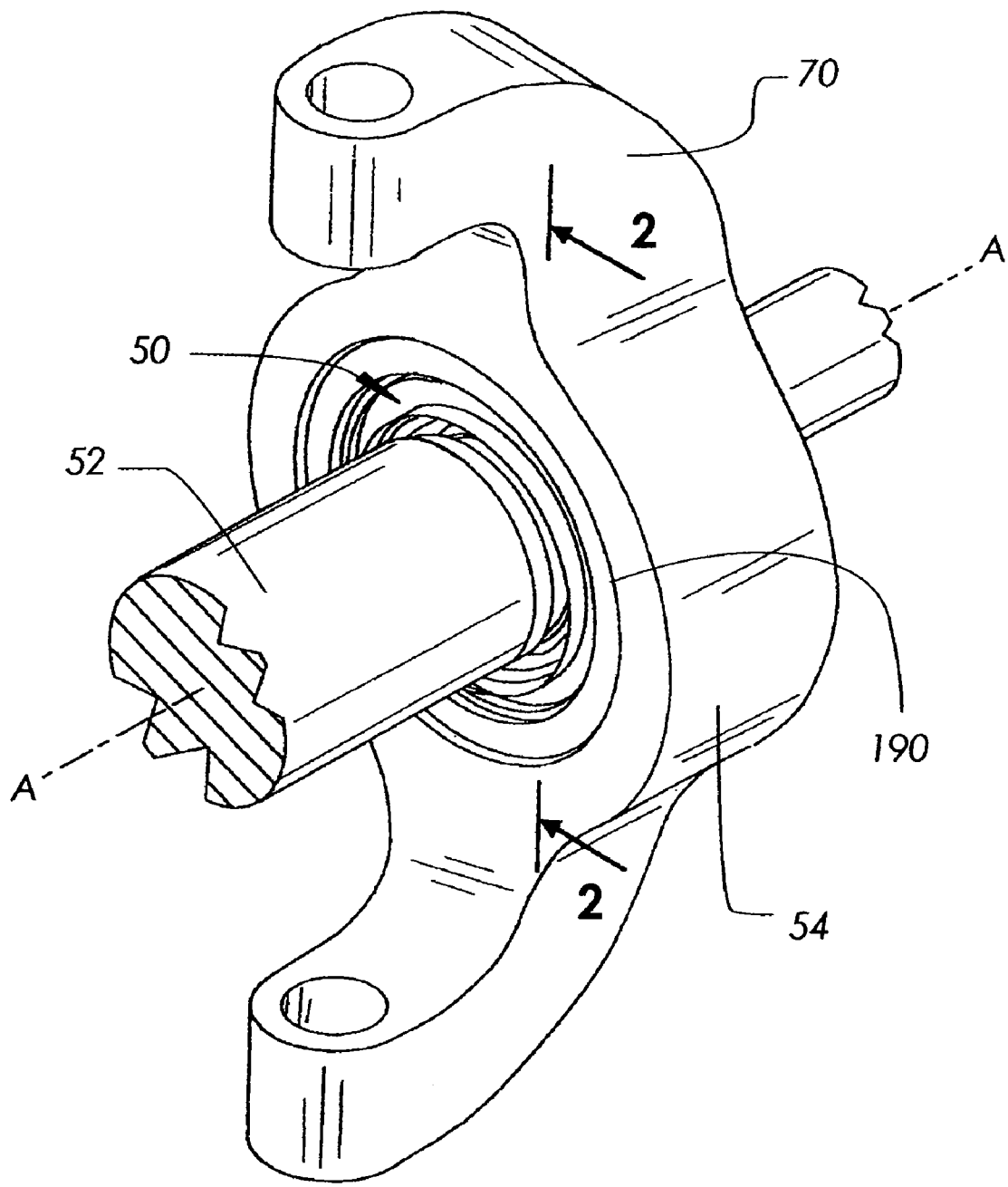
FIG. 1 is a front perspective view of a partial portion of an automobile axle assembly showing a drive shaft passing through a yoke hole in a yoke, and an example of a seal assembly operatively associated with the drive shaft and the yoke.
Figure 2:
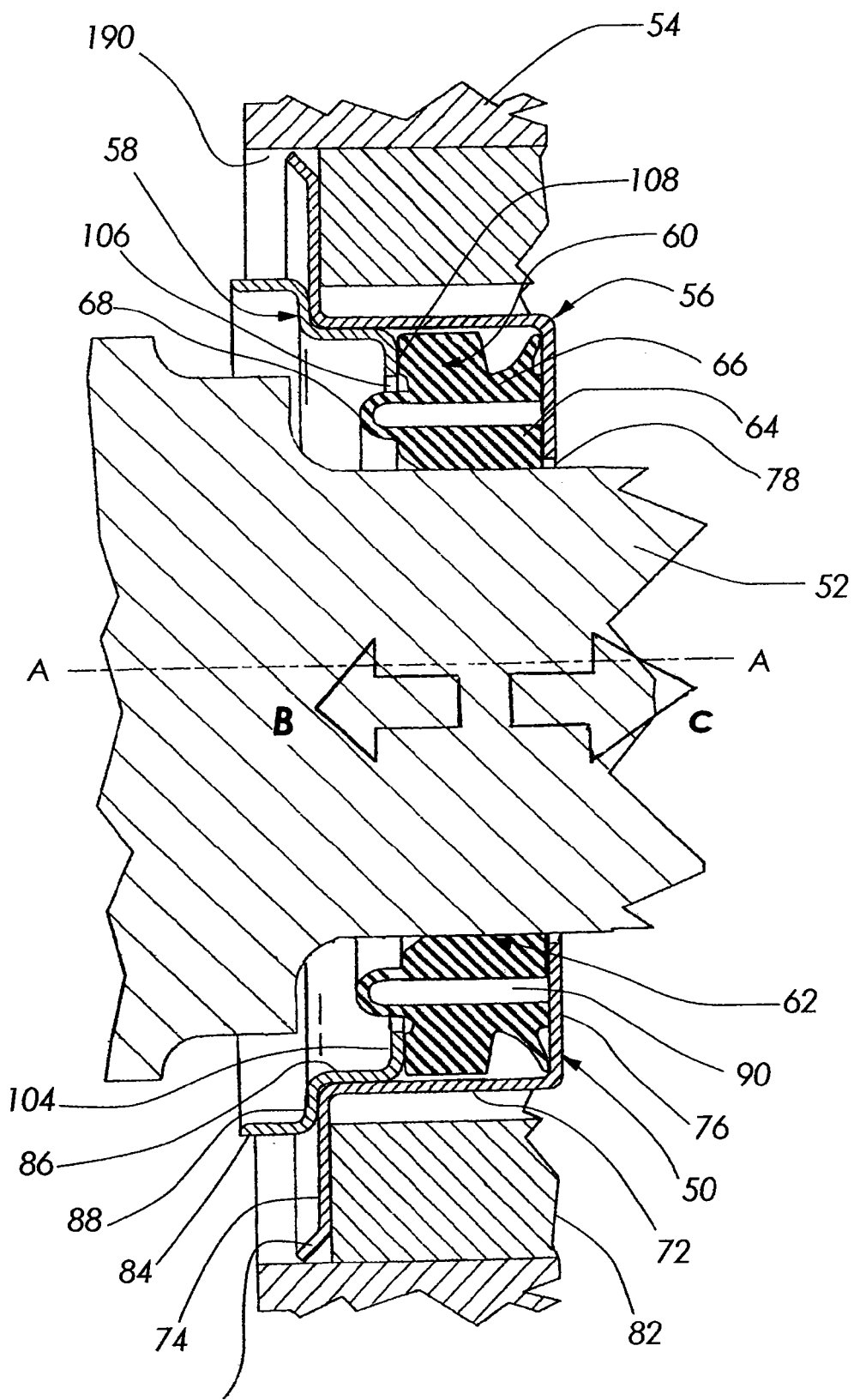
FIG. 2 is a cross-sectional view of the partial axle assembly shown in FIG. 1 viewed along line 2-2 showing the shaft in a first position relative to the example of the seal assembly.

Described herein, for instance with reference to FIGS. 1 and 2, is an example of a seal assembly 50 for use with relatively rotating members such as a rotating shaft 52 extending through a housing 54 or other structure. The seal assembly 50 may include a canister 56, or other housing, having a lid 58 that retains a seal member 60. The canister 56 may include a canister lip 80 for forming at least a somewhat sealed engagement with one of the relatively rotating members (e.g., a housing 54 encompassing a shaft 52). The seal member 60 may include a seal hole 62 or aperture for receiving another of the relatively rotating members (e.g., the shaft 52) to form a sealed engagement between such relatively rotating member and the seal member 60. Since one of the relatively rotating members may move generally parallel to the axis of rotation, the seal member 60 may include inner 64 and outer 66 portions interconnected by a flexible wall 68 that allows the inner portion 64 of the seal member 60 to move relative to the outer portion 66 of the seal member 60 in at least this direction.

FIG. 1 depicts one potential utilization of the example of the seal assembly 50. In particular, FIG. 1 depicts a front perspective view of a partial portion of an automobile axle assembly showing a rotating drive shaft 52 passing through a yoke hole or aperture 190 in a yoke 70. The yoke 70 may include a yoke body defining the yoke aperture 190 and a pair of yoke arms extending from the yoke body. End portions of the yoke arms may include second yoke holes for connecting the yoke 70 to other structures or parts of the automobile or other structure. The shaft 52 may rotate relative to the yoke 70 around the shaft's longitudinal axis A-A. As described in more detail below, the seal assembly 50 may be used to form a seal between the joint formed between the shaft 52 and the yoke 70, which may prevent oil, dirt and other undesirable material from passing through the joint.

Figure 5:
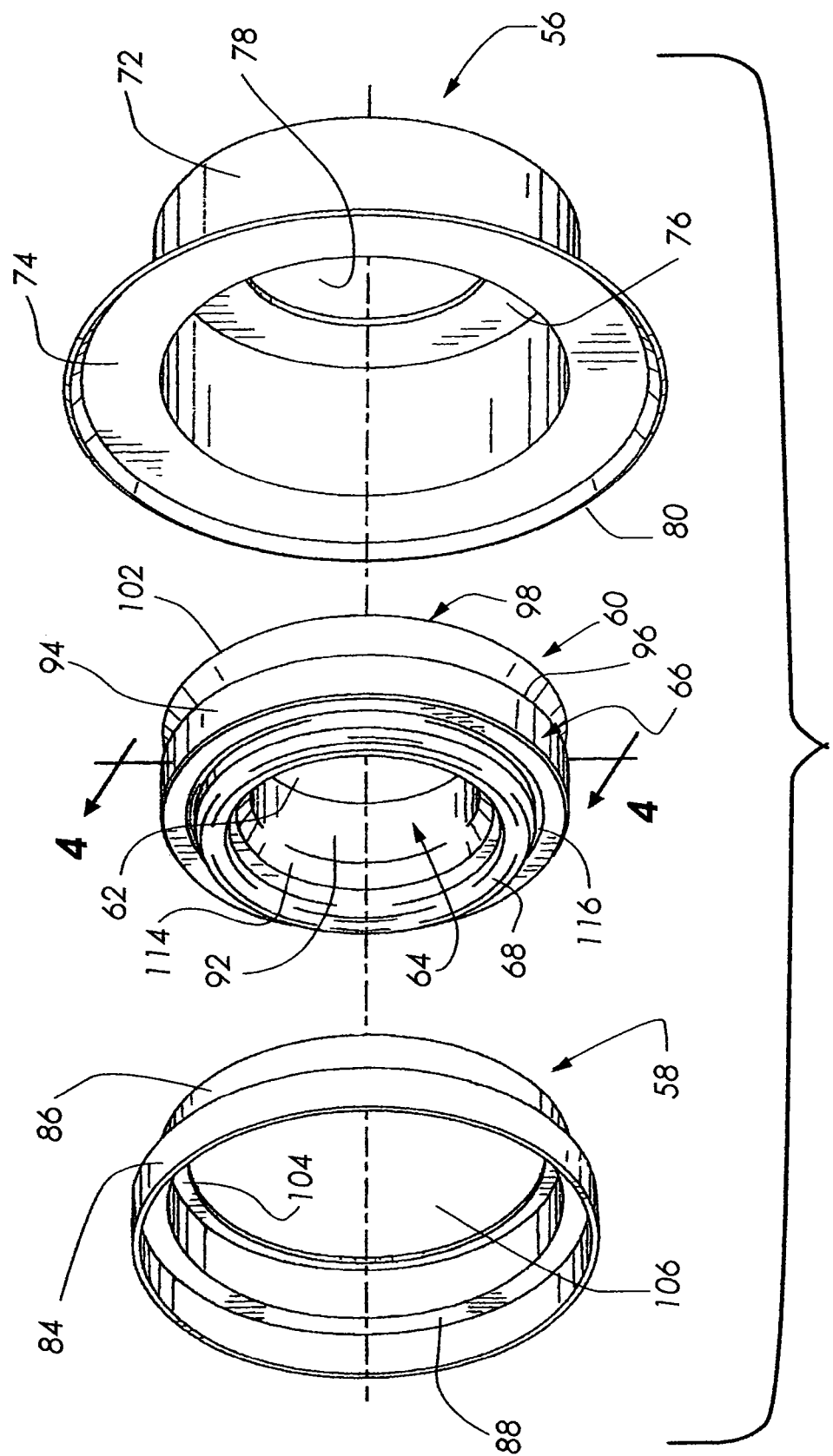
FIG. 5 is an exploded perspective view of the example of the seal assembly depicted in FIG. 1.
Figure 6:
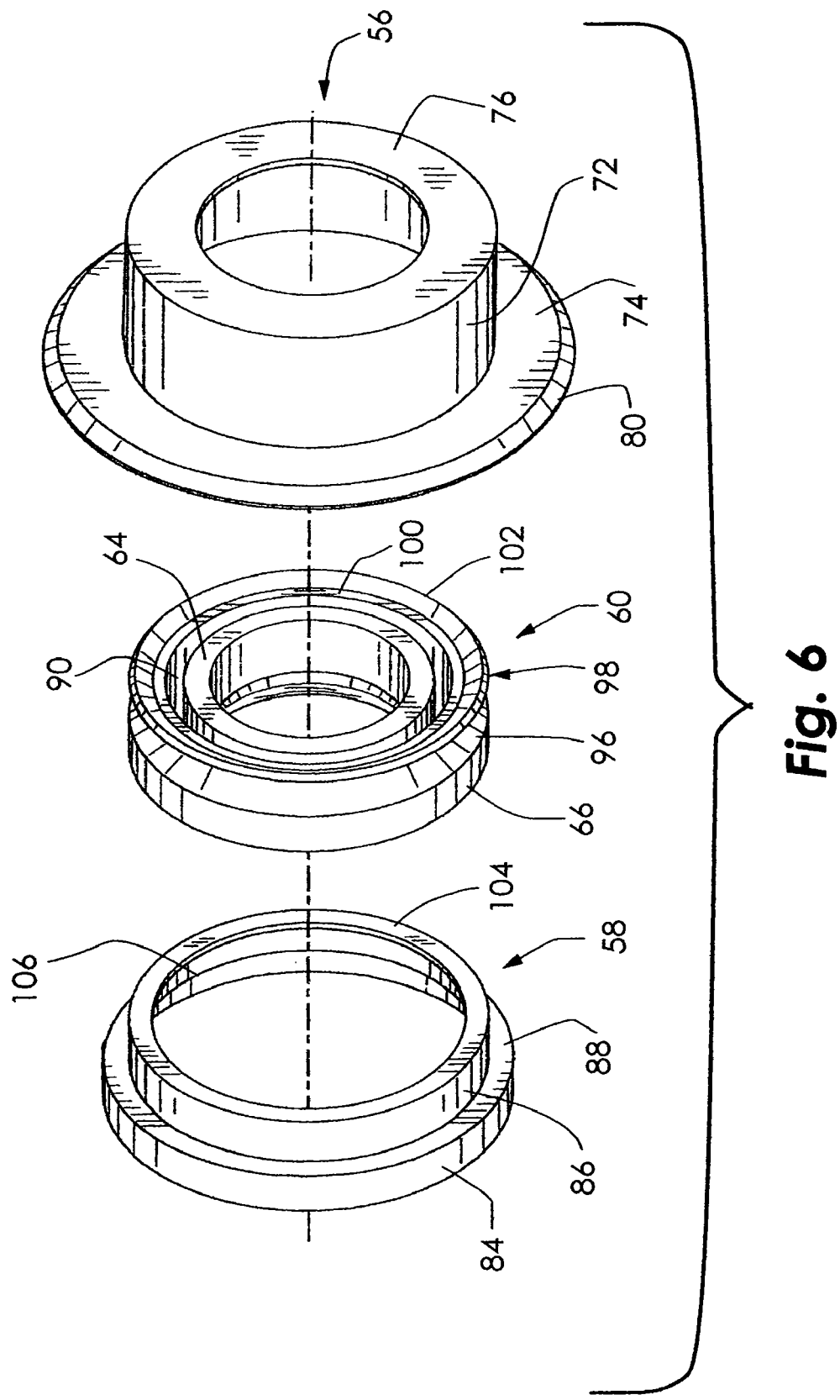
FIG. 6 is another exploded perspective view of the example of the seal assembly depicted in FIG. 1.

Turning to FIGS. 2, 5 and 6, the seal assembly 50 may include a canister 56, or other housing or member, operably associated with a lid 58, or other member, with a seal member 60 interposed there between. The canister 56 and the lid 58 may be composed of metal, plastic, ceramic, any other suitable material, or any combination thereof. The seal member 60 may be composed of elastomeric material, such as nitrile rubber, or any other suitable material. The canister 56 may include a generally cylindrical canister sidewall 72 interconnecting an annular canister bearing flange 74 with an annular canister seal flange 76. The canister bearing flange 74 may extend radially outward from the canister sidewall 72, and the canister seal flange may extend radially inward from the canister sidewall 72. Together, the canister sidewall 72 and the canister seal flange 76 may define an open canister area for receiving the seal member 60. The canister seal flange 74 may also define a canister hole 78 for receiving the shaft 52.

A canister lip 80 may extend angularly upwardly from the canister bearing flange 74 to help insert and retain the canister 56 within the yoke hole 68 and to form at least a somewhat sealed engagement between the canister 56 and the yoke 70. More particularly, as the canister 56 is inserted within the yoke hole 190, the canister lip 80 engages the surface of the yoke body 70 defining the yoke hole 68 and flexes slightly. As the canister lip 80 flexes, outward biasing spring forces develop within the canister lip 80 that press it against the yoke 70, thereby helping to retain the canister 56 within the yoke hole 190. The engagement of the canister lip 80 with the yoke 70 also forms at least a somewhat sealed engagement between the seal assembly 50 and the yoke 70. Thus, the yoke 70 and seal assembly 50 may combine to form a portion of the seal for the joint between the shaft 52 and the yoke 70. The remaining portion of the seal is formed by the sealed engagement between the seal assembly 50 and the shaft 52, which is described in more detail below.

The canister bearing flange 74 may bear against a tube 82 encompassing the shaft 52 along at least a portion of the shaft's length, thereby helping to locate or register the seal assembly 50 at the proper location along the shaft 52. The tube 82 may be press fit into the yoke hole 190, or otherwise associated with the yoke 70 such as by welding or using any other known method of joining two items. The tube 82 may be sized to form at least a somewhat sealed engagement between the tube 82 and the yoke 70. Any suitable structure may be used to form the register for the position of the seal assembly.

The lid 58 may include a cylindrical outer lid band 84 connected to a cylindrical inner lid band 86 by an annular outer lid flange 88. The exterior surface of the inner lid band 86 may be dimensioned to approximately match the interior surface of the canister sidewall 72, thereby allowing the lid 58 and the canister 56 to be joined by press fit. Although the lid 58 and canister 56 are described and depicted as being joined by press fit, methods other than, or in combination with, press fitting may be used to join the lid and the canister including welding, adhering, or mechanically fastening them to each other, using any other known method to join together two items, or any combination thereof.

Figure 3:
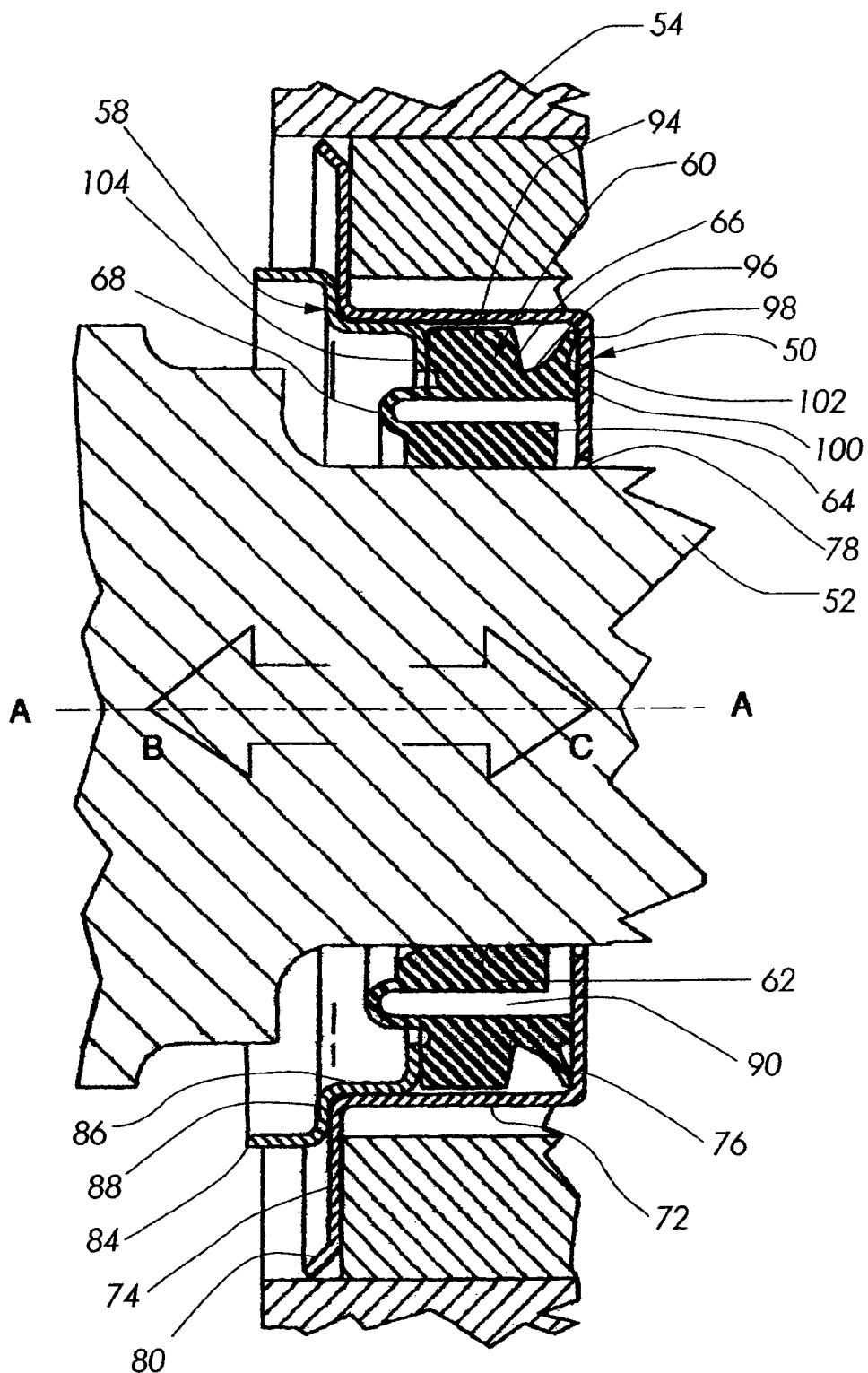
FIG. 3 is another cross-sectional view of the partial axle assembly shown in FIG. 1 viewed along line 2-2 showing the shaft in a second position relative to the example of the seal assembly.

The seal member 60 may include inner 64 and outer 66 seal portions spaced apart and interconnected by a flexible portion 68, in this example being a "C" or "arch-shaped" flexible wall, which may roll as shown by example in FIG. 3. The flexible wall 68 allows the inner seal portion 64 to move longitudinally relative to the outer seal portion 66, or vice versa, and to maintain sealed engagement with the shaft 52 as described in more detail below. In FIG. 3, the shaft 52 is shown having moved to the left, in the direction of arrow B. The flexible wall 68 has rolled to allow this relative movement. With reference to FIG. 2, a seal space 90 formed between the inner 64 and outer 66 seal portions allows the inner seal portion 64 to move radially towards the outer seal portion 66 when expanded, which permits the seal member 60 to accept shafts within a range of exterior dimensions as described in more detail below. The seal space 90 also allows the shaft 52 to be radially displaced off-center, or positioned at an angle, relative to the seal assembly 50.

Figure 4:
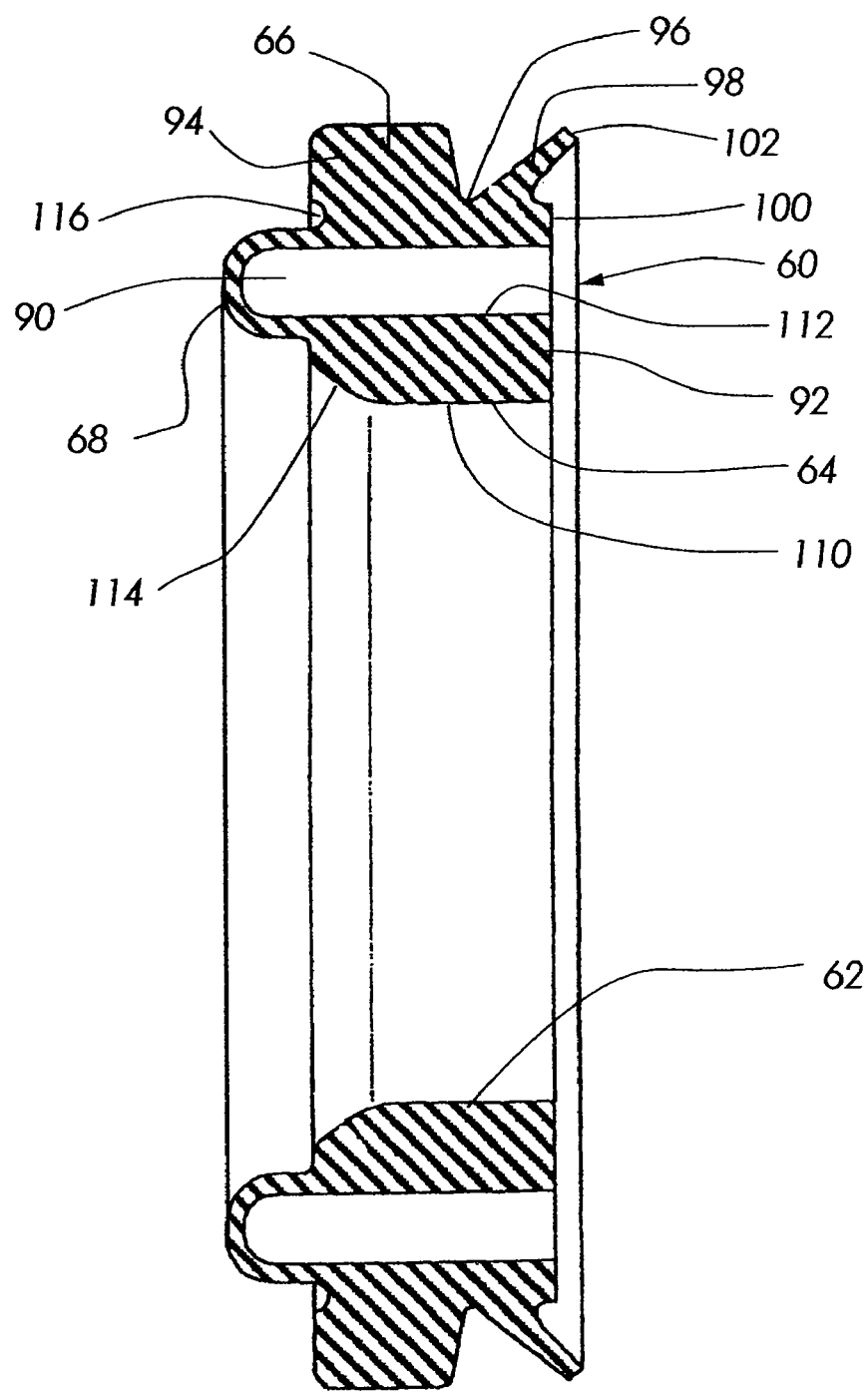
FIG. 4 is a cross-sectional view of the seal member used, for instance, in the example of the seal assembly depicted in FIG. 1.

With reference to FIGS. 4, 5 and 6, the seal hole 62 or aperture for receiving the shaft 52 may be defined by the inner seal portion 64. The seal hole 62 may have a shape generally matching the shape of the shaft 52 and may be sized to approximately match or be slightly less than the exterior dimensions of the shaft 52. For example, if the shaft 52 is generally cylindrical as depicted in FIG. 1, the seal hole 62 may be generally cylindrical with a diameter approximately equal to or slightly less than the shaft's outside diameter. Although the shaft 52 is depicted as cylindrical in FIG. 1, any suitable shape may be used for the shaft and the corresponding seal hole. While not required, when the seal hole's size is slightly less than the exterior dimensions of the shaft 52, a relatively snug fit between the seal member 60 and the shaft 52 may be formed, thereby enhancing the effectiveness of the seal formed between the seal member 60 and the shaft 52. Further, the seal space 90 formed between the inner 64 and outer 66 seal portions permits the inner seal portion 64 to move radially towards the outer seal portion 66, thereby allowing shafts 52 within a range of exterior dimensions approximately equal to or slightly greater than a pre-determined seal hole 62 size to be received through the seal hole 62 to form an effective seal between the shaft 52 and the seal member 60. Also, as referenced above and described further below, the seal space 90 also allows the shaft 52 to be radially displaced off-center, or positioned at an angle, relative to the seal assembly 50.

More particularly, prior to receipt of a shaft 52 within the seal hole 62 as shown in FIG. 4, the seal hole 62 may have a first hole size. When a shaft with exterior dimensions greater than the first hole size is received within the seal hole 62 as shown in FIG. 2, the inner seal portion 64 moves towards the outer seal portion 66, thereby increasing the seal hole 62 size and reducing the distance between the inner 64 and outer seal portions 66 (the seal space 90). As the inner seal portion 64 moves towards the outer seal portion 66, internal forces develop in the seal member 60, which bias the inner seal portion 64 to its original position. These internal forces press the inner seal portion 64 against the shaft 52, thereby forming a relatively effective seal between the shaft 52 and the seal member 60.

With reference to FIG. 3, the outer seal portion 66 may include a main body 94 connected by a necking region 96 to a wiper section 98 having a heel 100 and a toe 102. The toe 102 may generally extend angularly from the heel 100 portion in a direction radially away from the inner seal portion 64. When the seal member 60 is received between the canister 56 and lid 58, the toe 102 and heel 100 may abut the canister seal flange 76 and the main body 94 of the outer seal portion 66 may abut the canister sidewall 72, thereby forming a sealed engagement between the seal member 60 and the canister 56. The toe 102 may also bend outwardly along the canister flange 76 without engaging the canister sidewall 72. The heel 100 and the toe 102 both form rings that engage and bear against the inside surface of the canister 56. The main body 94 may also not engage or bear against the canister sidewall 72, leaving a gap there between. This allows for radial or other misalignment by the shaft 52 to either make the gap smaller, or eliminate the gap entirely or eliminate it at one end of the main body 94 or the other.

The toe 102 (of the wiper 98) may extend below the heel 100 as shown in FIG. 4 and the toe's thickness may taper down when moving outwardly from the main body 94 of the outer seal portion 66. Extending the toe 102 below the heel 100 may enhance the effectiveness of the seal between the wiper section 98 of the outer seal portion 66 and the canister 56. More particularly, as the lid 58 is joined with the canister 56 to retain the seal member 60 between them, the toe 102 generally moves upward until it generally aligns with the heel 100 as shown in FIG. 2. As the toe 102 is forced upwards, internal forces develop within the seal member 60 to bias the toe 102 to its original position as shown in FIG. 4. These internal forces press the toe 102 against the canister seal flange 76, thereby forming a relatively effective seal between the wiper section 98 of the seal member 60 and the canister seal flange 76. In one embodiment, the toe 102 may extend approximately 2 mm below the heel 100 and may have a thickness ranging between approximately 1 to 1.8 mm, and the angle formed between the toe 102 and the heel 100 may range between approximately 35 and 55 degrees. These toe 102 and angle dimensions are merely illustrative. Accordingly, the toe's 102 extension below the heel 100, the toe's thickness, and the angle between the toe 102 and the heel 100 may be greater or less than the dimensions set forth for this example.

The lid 58 may include an annular inner lid flange 104 extending radially inward from an end of the inner lid band 86 as shown in FIGS. 4, 5 and 6. The inner lid flange 104 defines a lid aperture 106 for receiving the shaft 52. When the canister 56 and the lid 58 are joined, the inner lid flange 104 engages an end 108 of the main body 94 of the outer seal portion 66. Further, the inner lid flange 104 and the canister seal flange 76 together retain the seal member 60 between them and substantially prevent longitudinal movement of the outer seal portion 66. The joined canister 56 and lid 58, however, do not longitudinally restrain the flexible wall 68 and the inner seal portion 64 in the direction indicated by arrow B, thereby allowing the inner seal portion 64 to move at least longitudinally with the shaft 52 as described in more detail below.

Although the joined canister 56 and lid 58 do not inhibit movement of the inner seal portion 64 and flexible wall 68 in the direction indicated by arrow B (see FIG. 2), the canister seal flange 76 does limit the longitudinal movement of the inner seal portion 64 of the seal member 60 in the opposite direction. Specifically, when the inner seal portion 64 of the seal member 60 engages the canister seal flange 76 as shown in FIG. 2, the canister seal flange 76 prevents further longitudinal movement of the inner seal portion 64 in the direction indicated by arrow C. Generally, however, the seal assembly 50 will be installed on the shaft 52 so that longitudinal movement of the shaft 52 in the direction indicated by arrow C is minimal when the inner seal portion 64 of the seal member 60 contacts the canister seal flange 76. However, the portion of the canister seal flange 76 limiting the movement of the inner seal portion 64 in the C direction of FIG. 2 may be removed if desired to allow for movement of the inner seal portion 64 in the C direction.

With reference to FIGS. 2 and 3, the shaft 52 rotates about longitudinal axis A-A. As the shaft 52 rotates about longitudinal axis A-A, the seal member 60 may rotate with the shaft 52. More particularly, since the seal member 60 is not fixedly attached to either the lid 58 or the canister 56, the seal member 60 may rotate around longitudinal axis A-A when received between the canister 56 and the lid 58. Friction between the seal member 60 and shaft 52 may be sufficient to transmit the shaft's rotation to the seal member 60, thereby causing the seal member 60 to rotate with the shaft 52 inside the canister 56. In effect, the seal member 60 not only forms a seal between the shaft 52 and the canister 56 of the seal assembly 50, but also may act as a bearing for the shaft 52 when connected to the seal assembly 50. Further, the inner portion 64, the outer portion 66, and the flexible wall 68 of the seal member 60 all rotate around longitudinal axis A-A relative to the canister 56 and the lid 58. The portions of the inner 64 and outer 66 seal portions in contact with the canister 56 and lid 58 form the seal therewith.

The shaft 52 may also move longitudinally along axis A-A. As the shaft moves longitudinally between the first position depicted in FIG. 2 and the second position depicted in FIG. 3, the inner seal portion 64 of the seal member 60 moves with the shaft 52 longitudinally relative to the outer seal portion 66. In particular, the flexible wall 68 permits the inner seal portion 64 to move at least longitudinally with the shaft 52 between the positions depicted in FIGS. 2 and 3 while the outer seal portion 66, which is restrained from longitudinal movement by the canister 56 and the lid 58, remains substantially stationary relative to the yoke 70. Allowing the inner seal portion 64 to move longitudinally with the shaft 52 may increase the life span of the seal member 60 by reducing the frictional wear between the seal member 60 and the shaft 52 which would occur if the shaft 52 moved longitudinally relative to the inner seal portion 64 when moving longitudinally along axis A-A between the positions shown in FIGS. 2 and 3.

Because of the flexible wall 68, as the shaft 52 moves longitudinally in the direction indicated by arrow B, the inner seal portion 64 stays in full engagement with the shaft 52 and is not substantially biased by the movement to be lifted up in part or moved axially relative to the shaft 52.

FIG. 4 depicts the seal member 60, including the inner seal portion 64, outer seal portion 66, and flexible wall 68 connecting the two. The inner seal portion 64 may include a main body 92 having an inner diameter 110 and an outer diameter 112. The inner diameter 110 defines the seal hole or aperture 62. The outer seal portion 64 may include a main body 94. As shown in FIG. 4, the flexible wall 68 may extend between an upper end of the inner seal portion 64 and an upper end of the outer seal portion 66. The inner side of the upper end of the inner seal portion 64 may form a chamfered edge 114, which is optional. The upper end of the outer seal portion 66 may include an annular groove 116 around where the flexible wall 68 engages the outer seal portion 66. The annular groove 116 helps improve the bendable and flexible engagement between the upper end of the outer portion 66 and the flexible member 68. The wiper section 98 of the outer portion 66 of the seal member 60 may include a toe portion 102 and a heel portion 100, as described above.

FIG. 5 depicts an exploded view of the seal assembly, including the canister 56 and the seal member 60, and the lid 58. The canister 56 is shown including the canister sidewall 72, the canister bearing flange 74, the canister lip 80, the canister seal flange 76, and the canister aperture 78 for the shaft 52. The seal member 60 is shown including the inner seal portion 64, outer seal portion 66, flexible wall 68, toe 102 and the seal aperture 62. The lid 58 is shown including outer lid band 84, the outer lid flange 88, the inner lid band 86 and the lid aperture 106.

FIG. 6 depicts an exploded view of the seal assembly similar to that of FIG. 5, but for being at a reverse angle. The toe 102 and heel 100 of the wiper portion 98 of the seal member 60 are shown in this view.

The seal assembly 50 in this example and others may be assembled by placing the seal member 60 within the canister 56 toe end first. The lid 58 may then be press fit onto the canister 56, thereby retaining the seal member 60 between the canister 56 and the lid 58. If desired, grease or other suitable lubricant may be placed on the seal member 60 or the lid 58, or within the canister 56, at any time prior to or after joining the lid 58 to the canister 56 to facilitate the rotation of the seal member 60 within the seal assembly 50 as described in more detail above.

In the following additional examples of the invention, many structural features and their functions are the same or similar to that described above. For clarity, however, unique reference numbers may be used even though the referenced structure may have the same or similar features or function as earlier or later referenced elements.

Figure 10:
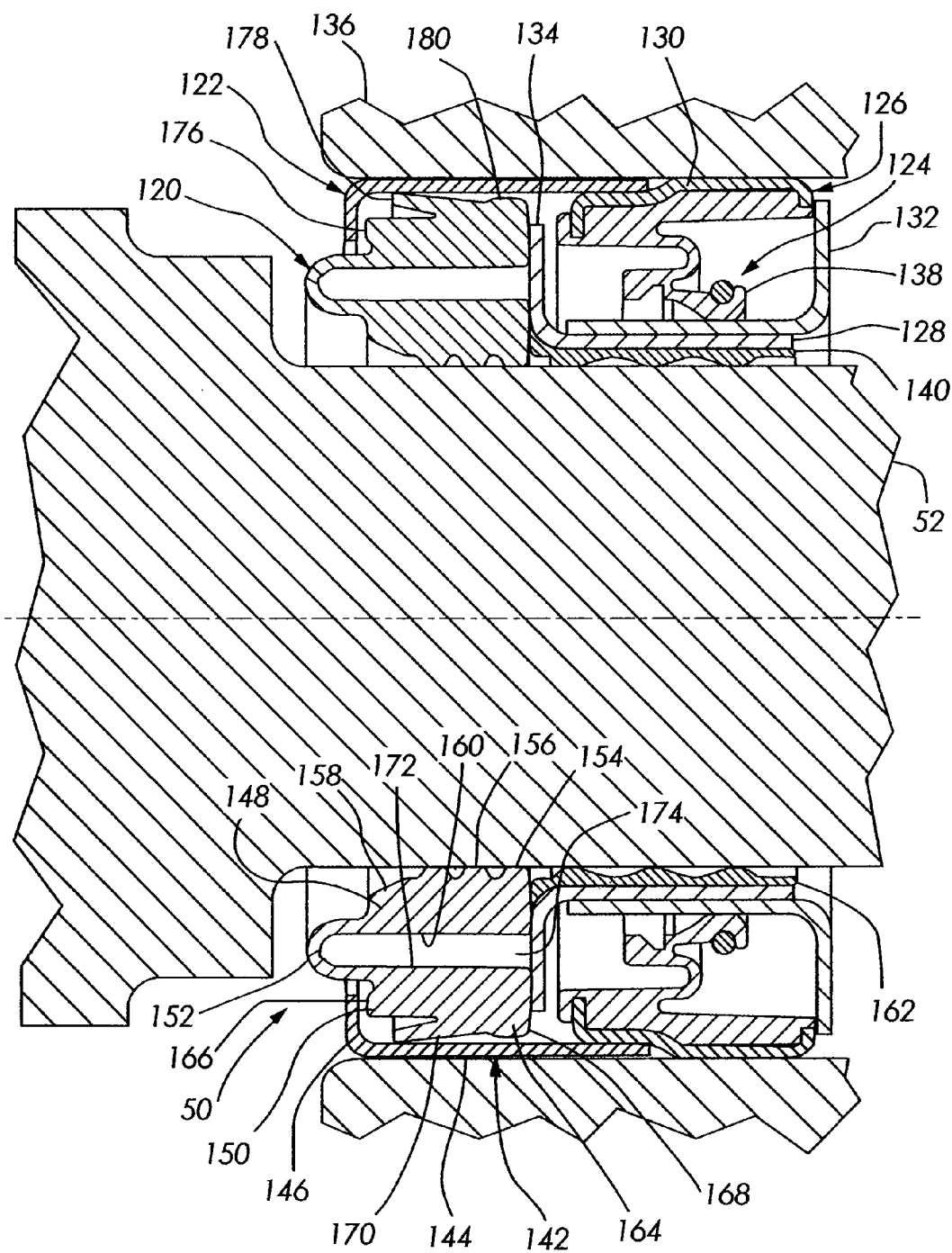
FIG. 10 is a section view taken along line 10-10 of FIG. 7 and showing a representative shaft positioned in the seal assembly.
Figure 11:
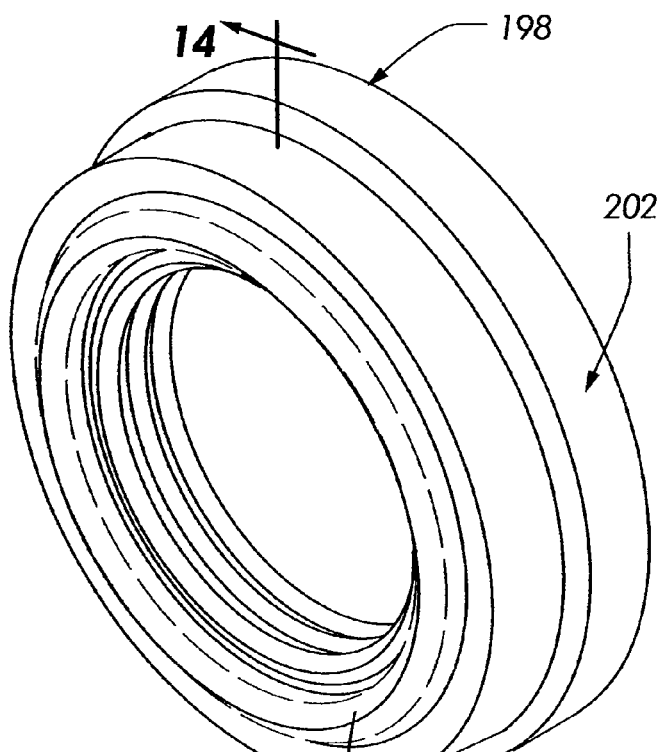
FIG. 11 is a perspective view of an example of the present invention, including a seal assembly.

FIGS. 7-10 show an example of the invention described herein. In this example, the seal assembly 50 may include a seal member 120 and a canister 122 (or other housing), forming an excluder seal, used in conjunction with a known oil seal 124 (see FIG. 10). The known oil seal 124 is positioned in a cassette 126 designed for accepting engagement with the seal assembly 50. As best shown in FIG. 10, this unitized position controlled cassette excluder seal assembly includes the known oil seal 124 having a cassette 126 including an inner radial wall 128, an outer radial wall 130, an inner axial wall 132 and an outer axial wall 134. With reference to FIG. 10, the inner axial wall 134 is the oil side of the assembly. In this example of the known oil seal 124, the known oil seal 124 engages the rotating shaft 52 and the housing 136 surrounding the shaft 52. It includes a lip section 138 and a counterface section 140. The lip section 138 is stationary and does not rotate with the shaft 52, and the counterface section 140 rotates with the shaft 52. The known oil seal 124 is but one example of oil seals with which the excluder seal may be used. The excluder seal mounts on the axially outer end of the cassette 126 of the known oil seal 124.

The excluder seal in this example includes a canister 142 that mounts on to the cassette 126 of the known oil seal 124, and a seal member 120. The canister 142 includes an outer wall 144 and a top flange 146. The canister 142 may be attached to the cassette 126 by press-fit around the outer radial wall 130 of the cassette 126, as shown, or may be associated by any other type of suitable connection or in any functional orientation. The canister 142 contains the seal member 120 in position and provides bearing or seal surfaces as described in more detail below.

The seal member 120 in this example, best shown in FIGS. 9 and 10, includes inner 148 and outer 150 seal portions connected by a flexible member 152, similar to the seal member 60 example described above. The inner seal portion 148 defines an inner radius surface 154 for engaging the shaft 52. The inner radius surface 154 in one embodiment has at least one, and in this example three, raised annular ridges 156 for engaging the outer surface of the shaft 52. The inner seal portion 148 is an expandable collar to form a snug fit around a shaft 52 inserted there through. An annular chamfered shoulder 158 is formed around the top edge of the inner radius surface 154. The inner seal portion 148 includes an outer radial surface 160. The inner axial end 162 of the inner seal portion 148 engages the axial outer end 134 of the cassette 126. The outer seal portion 150 includes a main body 164 having an axial outer end 166, an axial inner end 168, a radial outer side 170 and a radial inner side 172. A seal gap 174 is formed between the outer radial surface 160 of the inner portion 148 and the inner radial surface 172 of the outer portion 150. The seal gap 174 serves the same purpose as the seal gap described above.

The outer seal portion 150 and the inner seal portion 148 are confined in the canister 142 by the outer canister wall 144, top flange wall 146 of the canister 142, and the outer axial wall 134 of the cassette 126. An axial outer bearing surface 176 is formed on the outer seal portion 150 to be adjacent to and spaced away from the flange wall 146 of the canister 142. In some operating instances, these two surfaces may be in engagement. A wiper seal 178 is formed on the radial outer side 170 and extends from the radial outer side 170 toward the axial outer end 166 at an acute angle. The tip of the wiper seal 178 engages the inner surface of the canister wall 144 and bears against it to form a sealed engagement. A bearing surface 180 is also formed at the axial inner end of the outer radial surface 170 of the outer seal portion 150. This bearing surface 180 is positioned adjacent to and in some operating environments may engage the inner surface of the outer wall 144 of the canister 142. The axial inner end 168 of the outer portion 150 of the seal engages the axial outer end 134 of the cassette 126 and provides a sealed arrangement therewith.

FIG. 7 shows the canister 122 of the excluder seal mounted on the cassette 126 of the known oil seal 124 to act in conjunction therewith. FIG. 8 is a perspective view of the seal member 120 of this example, and shows the outer seal portion 150 including the outer bearing surface 180, wiper seal 172, and axial bearing surface. The flexible wall 152 is shown rollingly associating, as with the previous example, the inner seal portion 148 to the outer seal portion 150. The chamfered corner 158 of the inner seal portion 148 is also shown, along with the three annular ridges 156 on the inner radial surface 154 of the inner seal portion 148.

In operation, the example shown in FIGS. 7-10 function very similarly to the above-identified example. The shaft 52 is inserted through the central apertures of the excluder seal and the known oil seal 124. As described above, the shaft 52 rotates relative to the known oil seal 124, and the seal member 120 of the excluder seal rotates with the shaft 52 and relative to the canister 122. The various seal surfaces and bearing engagements act to seal out unwanted contaminants from reaching the oil seal and negatively impacting the performance thereof. The flexible wall 152 allows relative movement, both longitudinally and axially, of the inner 148 and outer 150 portions of the seal member 120 in the excluder seal. If there is any axial misalignment of the shaft 52 with the seal structures, the seal gap 174 may allow such misalignment to not affect the performance of the seal member 120 given the various bearing and seal surface alignments between the outer seal portion 150 and the canister 122. The wiper seal 178 of the outer seal member 150 may form a substantial barrier against the migration of contaminates through the excluder seal from the air side to the oil side, to attempt to keep the contaminates out of the cassette 126 of the known oil seal 124. The overlapping of the outer radial wall 130 of the cassette 126 by the outer wall 144 of the canister 142 helps to keep contaminates out of the cassette 126 of the known oil seal 124 by forming a barrier against the migration of contaminates from between the interface of the excluder seal (or the known oil seal 124) and the housing 136. The inner seal member 148 helps keep contaminates from migrating to the interface of the known oil seal 124 and the shaft to help maintain the integrity of that seal. Other structures or features of the excluder seal, such as the seal gap 174, the flexible wall 152 and so on, serve the same of similar functions or purposes as the same or similar structures or features of the example of the seal assembly 50 of FIGS. 1-6.

Figure 12:
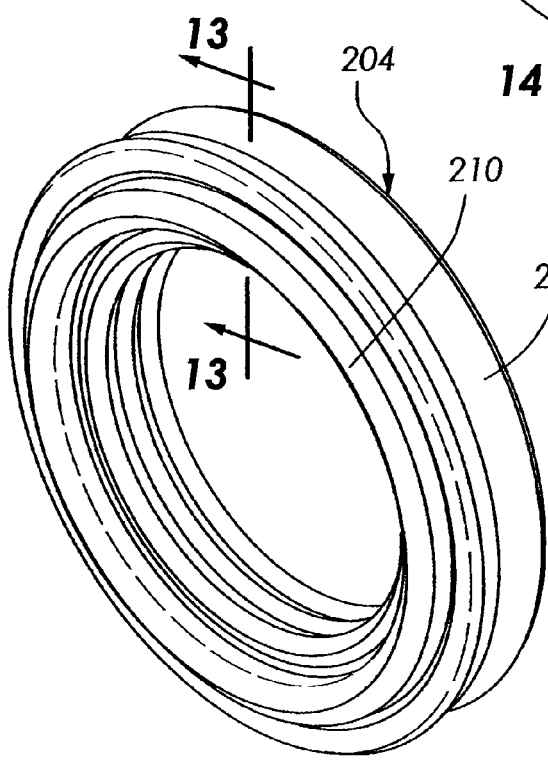
FIG. 12 is a perspective view of the seal member used, for instance, in the example shown in FIG. 11.
Figure 13:
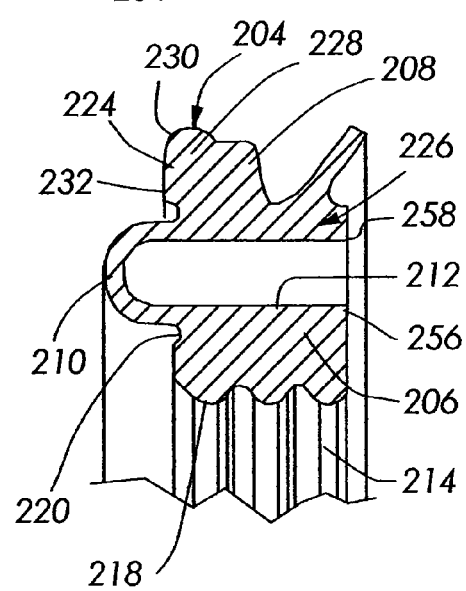
FIG. 13 is a partial section view taken along line 13-13 of FIG. 12.
Figure 14:
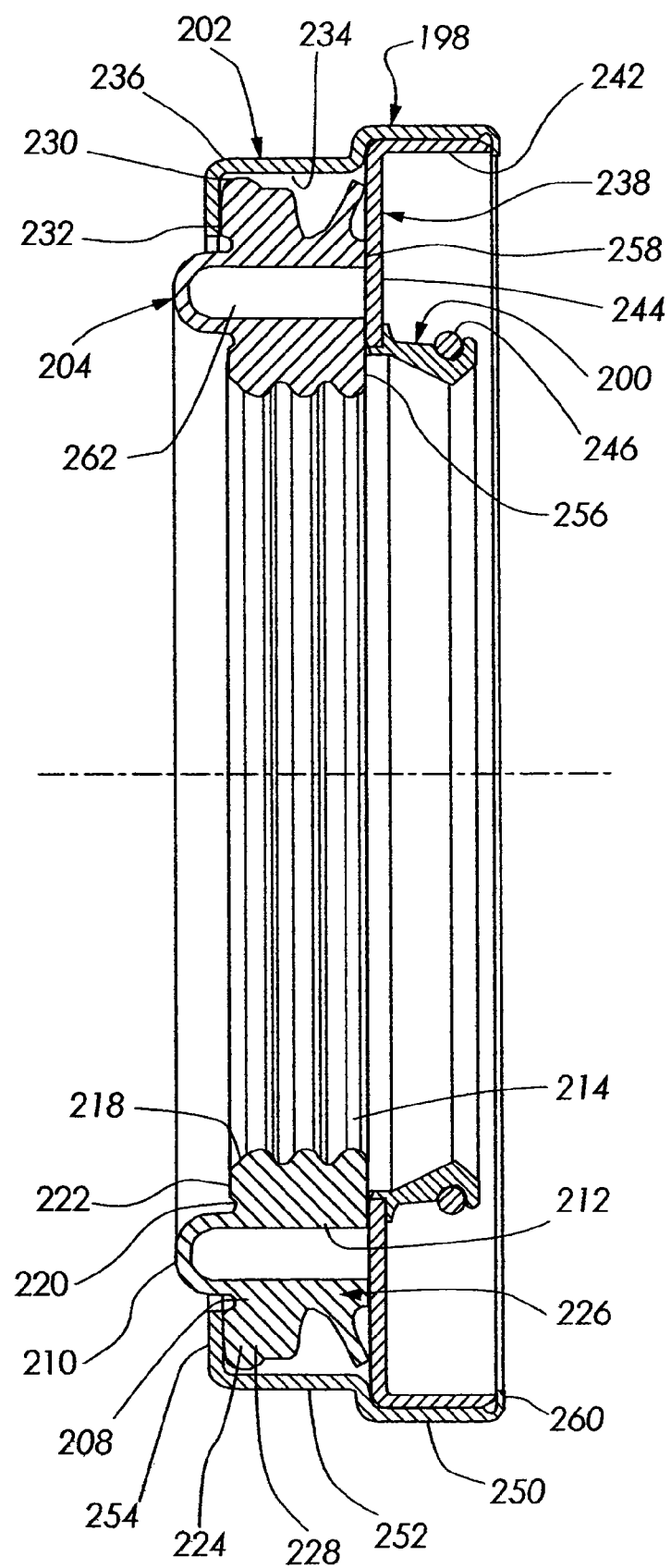
FIG. 14 is a section view taken along line 14-14 of FIG. 11.

FIGS. 11 through 15 show another example of the seal assembly 198 of the present invention. In this example, the seal assembly 198 also works as an excluder seal in conjunction with a known oil seal 200. In this example, the excluder seal 198 includes a canister 202 (or other housing or member) and a seal member 204. The canister 202 and seal member 204 mate with a known oil seal 200 positioned in a cassette 238 designed to receive such engagement. See FIGS. 11 and 14. As best shown in FIGS. 12 and 13, the seal member 204 of the seal assembly 198 includes an inner seal portion 206 and an outer seal portion 208 rollingly connected by a flexible wall member 210, as described above. The inner seal portion 206 is substantially similar to the inner seal portions described above with respect to the other examples in that it has a main body 212, inner annular ridges 214 for engagement with the shaft 216, and an chamfered edge 218. An additional detail is that there is an annular groove 220 formed around the axially outer surface 222 of the inner seal portion 206, with the groove 220 being located adjacent to and radially outward from the intersection of the flexible wall 210 with the inner seal portion 206. The outer seal portion 208 is similar to that structure shown in FIGS. 1-6, in that it has a main body 224 with a wiper structure 226, and an outer bearing structure 228. Additionally, it has a radially outer bearing surface 230 formed adjacent the axially outer end 232 of the main body 224. This bearing surface 230 is positioned adjacent to the inner surface 234 of the outer wall 236 of the canister 202, but is not in contact therewith. In some operating environments, the bearing surface 230 will be in contact with the canister 202, for instance where the shaft 216 is radially misaligned with the seal assembly 198.

Figure 15:
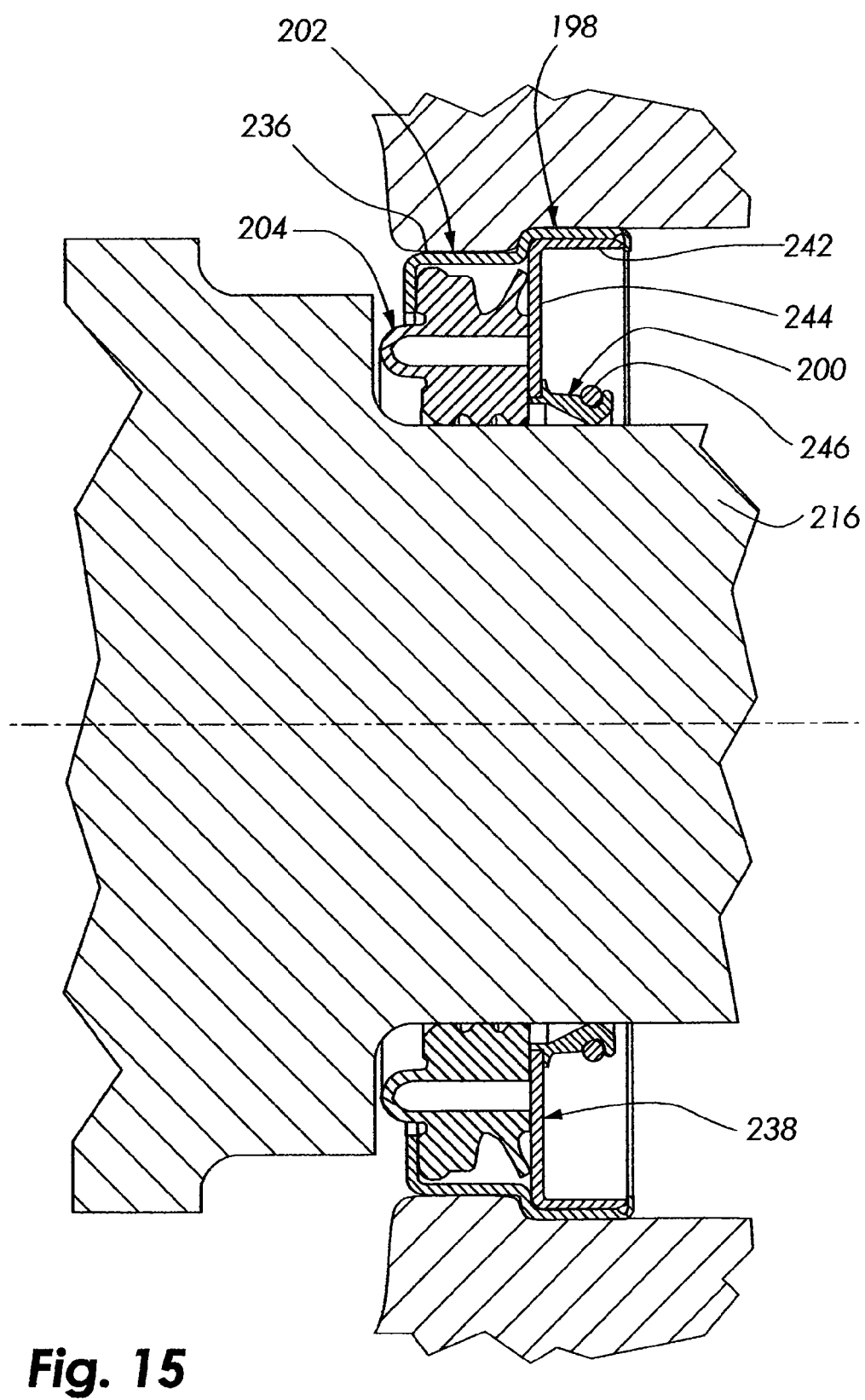
FIG. 15 is a representative section view similar to that of FIG. 14 showing a shaft positioned in the seal assembly.

In this example, the cassette 238 for the known oil seal 200 includes an outer wall 242 and an axial flange 244 forming an aperture to receive the shaft 216 (see FIG. 15). The oil seal 200 is centered on and associated with an aperture formed through the axial flange 244, and includes a garter spring 246 to keep the oil seal 200 in engagement with the shaft 216. The canister 202 in this example has an outer radial wall 234 with two sections, the axially inner section 250 has a larger diameter and the axially outer section 252 has a smaller diameter. An axially outer flange 254 is formed with the axially outer section 252 of the wall 234 and extends radially inward. The seal member 204 is positioned between the canister 202 and the cassette 238, similarly to that described regarding FIGS. 7 through 10. The cassette 238 of the known oil seal 200 is positioned in the canister 202, with the outer wall 242 of the cassette 238 fitting entirely inside the canister 202 (in this embodiment, but is not required).

In the assembled structure, the seal member 204 is positioned between the axial outer flange 244 on the cassette 238, the outer wall 236 of the canister 202, and the axial outer flange 254 of the canister 202. The axially inner ends 256, 258 of both the inner and outer (the wiper portion) portions 206, 208 of the seal member 204 engage the axial flange 244 of the cassette 238. The axial flange 244 on the cassette 238 engages the outer axial end of the outer seal portion 208. When a shaft 216 is positioned through the combined excluder seal and known oil seal 200, the shaft 216 is engaged by the inner portion 206 of the excluder seal, as well as the oil seal 200. The inner portion 206 of the seal member 204 is sized to snugly-fit around the shaft 216, and expand if necessary to fit around the shaft 216. The shaft 216 turns relative to the oil seal 200, and the seal member 204 of the excluder seal turns with the shaft 216 relative to the canister 202. In this example, the axial inner end 260 of the canister 202 is bent around the end of the cassette wall 242 to keep the cassette wall 242 positioned therein, as well as to provide a rounded surface to assist in positioning the cassette within the canister 202.

Figure 16:
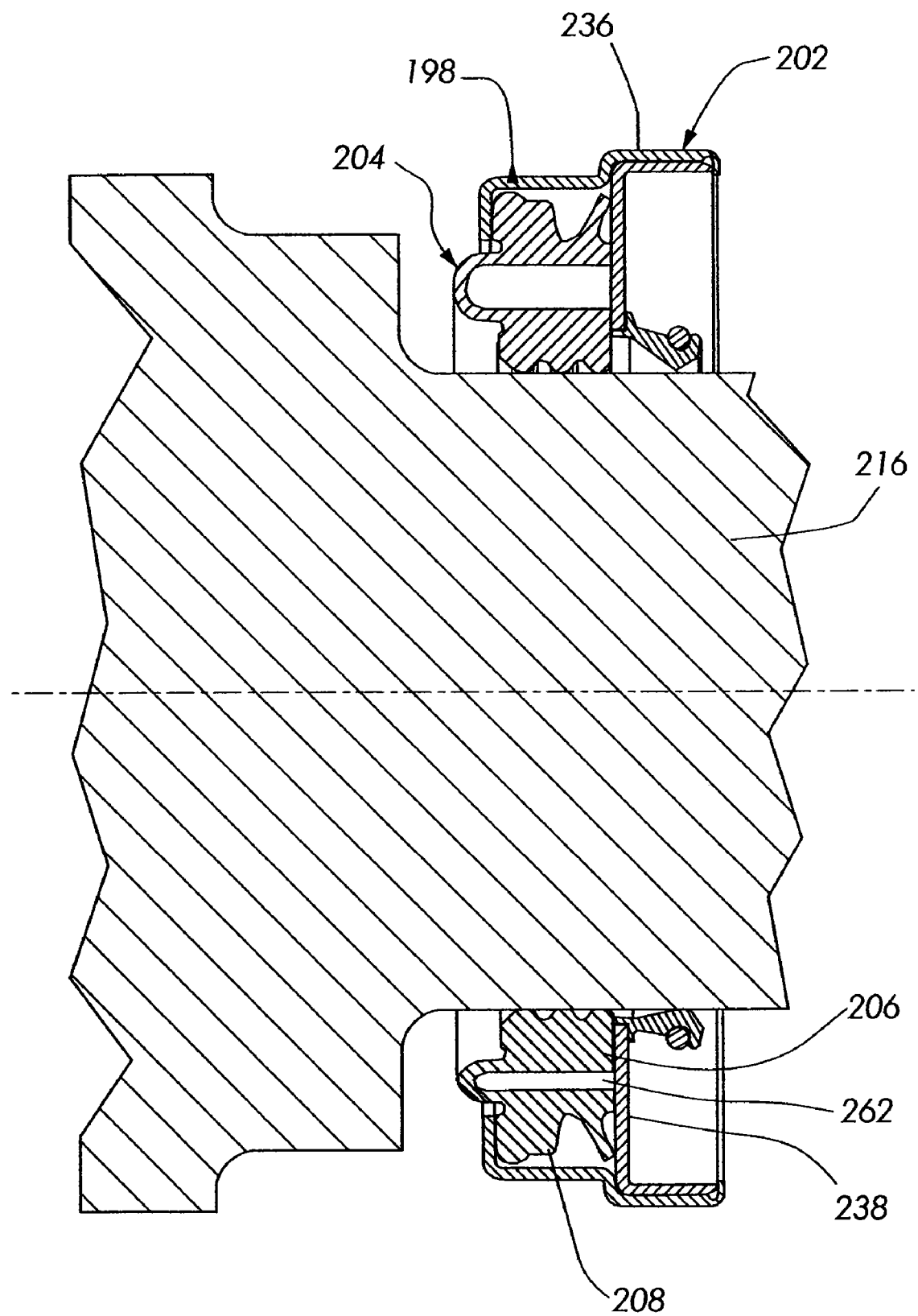
FIG. 16 is a representative section similar to FIG. 15, showing a shaft positioned in the seal assembly and offset with respect thereto.
Figure 20:
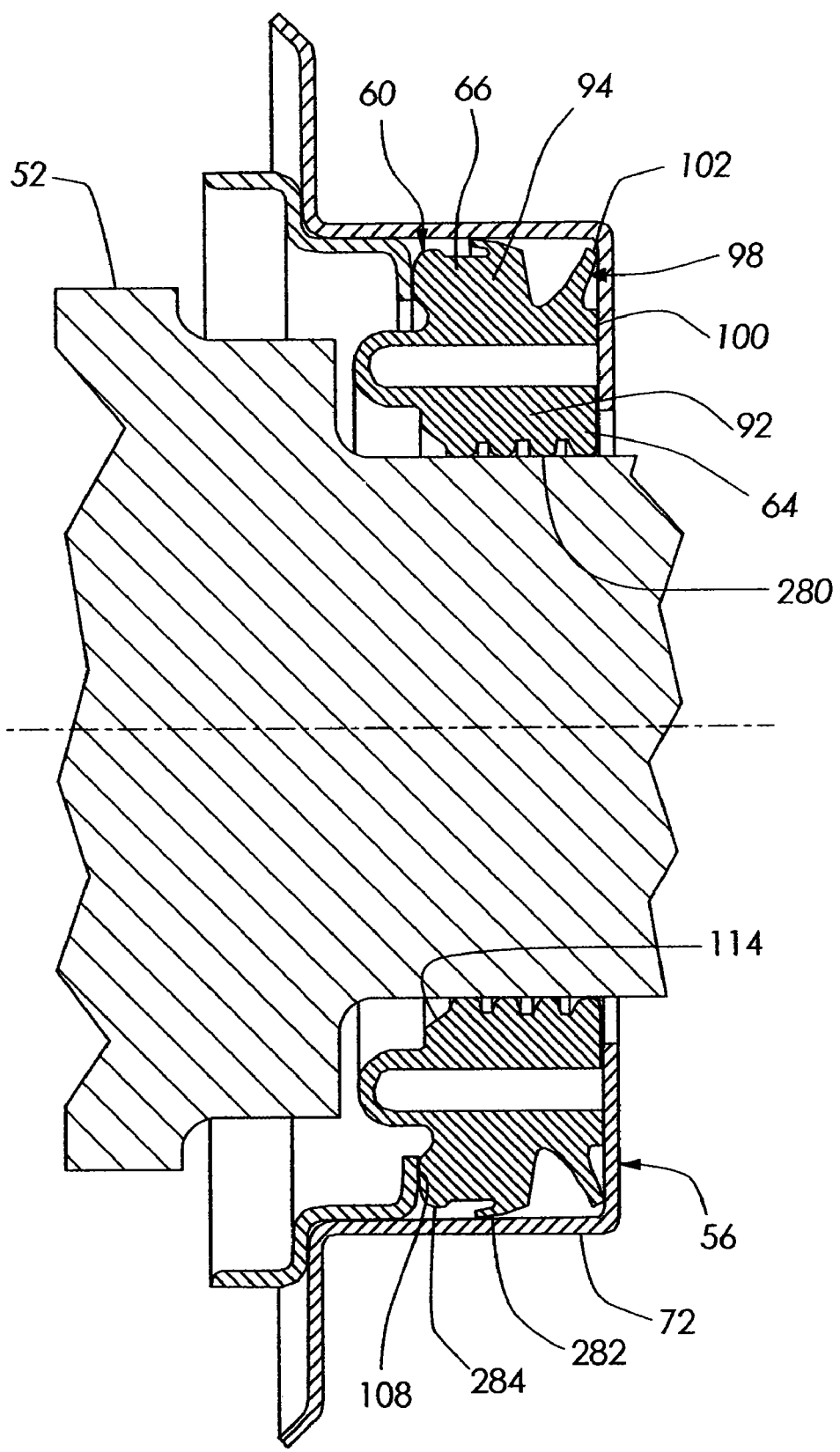
FIG. 20 is a section view taken along line 20-20 of FIG. 17, and showing a representative shaft positioned in the seal assembly.

FIG. 16 shows an off-center positioning of the shaft 216 in the seal assembly of FIGS. 11-15. This may occur as a fixed radially off-center positioning, meaning the alignment of the shaft 216 to the seal and surrounding structure is mis-aligned, or it may happen cyclically during rotation of an otherwise properly aligned shaft 216 (where the shaft may be out of balance). As can be seen from FIG. 16, where the shaft 216 is radially off-set, the seal gap 262 between the inner and outer seal portions 206, 208 of the seal member 204 accommodates for the alignment off-set and allows the excluder seal structure 198 to continue to operate properly. Further off-set of the shaft 216 would cause the outer portion 208 of the seal member 204 to engage the wall 236 of the canister 202 where there is typically a gap, but this is also accommodated by the bearing surfaces described herein. Other structures or features of the excluder seal, such as the flexible wall 210, the wiper structure 226 and so on, and the known oil seal 200 function in the same or a similar manner to the like or same features of the examples of seal assemblies depicted in FIGS. 1-10. Further, these other structures or features serve the same or similar functions or purposes as the same or similar structures or features for the previously described examples.

FIGS. 17 through 20 show another example similar to that shown in FIGS. 1-6. As with the example shown in FIGS. 1-6, this example is also able to be used alone, or it may be used in conjunction with a known oil seal housed in a cassette to allow the canister of this excluder seal to mate therewith. A few features are included in the example of FIGS. 17 through 21 not shown in FIGS. 1-6, however. Best seen in FIGS. 19 and 20, one is the at least one annular ridge 280 (in this example four) formed on the radially inner surface of the inner seal portion 64. As described above with respect to these features similar to other embodiments, the at least one annular ridge 280 enhances the engagement of the inner portion 64 of the seal member 60 with the shaft 52 fitting there through. Also, a wiper seal structure 282 is formed on the outer surface of the outer portion 66, which engages the inside of the outer wall 72 of the canister 56. Also, a bearing surface 284 or shoulder is formed extending radially away from the axially outer end 108 of the outer portion 66. In the event the shaft 52 is misaligned in the seal assembly 50, the bearing surface 284 may act as another sealing feature without degrading the performance of the rest of the seal. The bearing surface 284 and the wiper seal 282 may be effective in conjunction with each other since there is a recess below the wiper seal 282 so that it can fold relatively flat in the event the bearing surface 284 is in engagement with the sidewall 72 of the canister 56.

FIGS. 18 and 19 show these features also, with the outer seal portion 66 having a main body 94, wiper structure 98 having both a toe 102 and heel 100 portion, a wiper seal 282 on the outer surface of the main body 94, and a bearing surface 284 on the outer surface of the main body 94. The inner seal portion 64 includes a main body 92 with at least one annular ridge 280 formed thereon (in this example four), and the chamfered inner edge 114.

Although the various elements of the canister, lid, seal member, and cassette and other features, have been described and depicted as having certain shapes, any suitable shape may be used for any or all of these elements. Further, the various elements (sidewalls, bands, flanges, etc.) for the lid, canister, seal member and cassette or other members or components may be integrally formed or may be one or more components joined by any known methods for joining two or more items. Additionally, although the seal assembly has been described and shown in some examples as sealing a joint between a rotating shaft and a yoke, the seal assembly may be used to form a seal between any two relatively rotating parts. The inner and outer portions of the seal member may be made of different materials, or may be made of the same material. The inner or outer portions of the seal member may include more than one material in each. For instance, the inner portion may have a softer material (i.e. a softer rubber) in engagement with the shaft and a harder material (i.e. a harder rubber) as a backer to the softer material.

Although a flexible wall is depicted and described throughout as allowing the inner seal portion to move longitudinally relative to the outer seal portion (and vice versa), other methods may be used in lieu of, or in combination with, the flexible wall. For example, the inner and outer seal portions may be joined by a material with material properties that make the material relatively flexible in the longitudinal direction compared to the inner and outer seal portions. As another example, the inner and outer seal portions may be joined by one or more relatively rigid links pivotally connected to each seal portion or by a material that allows motion in shear.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the present invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other. Also, reference is made throughout to a "seal" or a "sealed engagement." It is contemplated that these terms are not limited to functioning to exclude all undesirable contaminants, but are inclusive to at least include the function of partially excluding or partially prohibiting some portion of undesirable contaminates from passing past the seal engagement. Also, reference is made herein to known oil seals. Such reference is by way of explaining that the excluder seal assemblies described herein may be used individually or in conjunction with the known oil seals, and that such use either alone or in conjunction with the known oil seals is believed to be unique, new, useful and non-obvious. Reference is made herein to a seal member having a bearing surface that may contact a canister, cassette, or shaft. The word "bearing" is contemplated to mean that the bearing engagement may only be a force distributing point between two bodies, or may or may not be a seal engagement, or it may or may not include relative movement between the seal member and the body against which it bears.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Changes in detail or structure may be made without departing from the spirit of the invention as defined in the appended claims. Accordingly the matter contained in the above description or shown in the accompanying drawings shall be interpreted as illustrative only and not limiting.

What is claimed is:

1. A seal assembly for radially spaced inner and outer members comprising:
    a canister;
    a seal member including an inner portion configured to form a seal with the inner member, an outer portion in sealed engagement with the canister, and an intermediate portion connecting the outer portion to the inner portion and permitting relative movement between the outer portion and the inner portion in at least a first direction; and
    a lid operatively associated with the canister, wherein the lid directly engages at least a portion of a surface of the outer portion to substantially prevent movement of the outer portion of the seal member relative to the canister and the lid in the first direction when the canister is operatively associated with the lid.

2. The seal assembly of claim 1, wherein the intermediate portion of the seal member comprises a flexible wall.

3. The seal assembly of claim 2, wherein the flexible wall may roll in the first direction.

4. The seal assembly of claim 1, wherein the canister comprises a first flange extending radially inward from a sidewall.

5. The seal assembly of claim 4, wherein:
    the outer portion of the seal member includes a main body connected to a wiper section; and
    the wiper section is in sealed engagement with the first flange.

6. The seal assembly of claim 1, wherein the seal member may rotate within the canister.

7. The seal assembly of claim 1, wherein the inner member comprises a shaft and the outer member comprises a member selected from the group consisting of a housing or a yoke.

8. A seal assembly for radially spaced inner and outer members comprising:
    a first member for operative association with the outer member;
    a seal member including an inner portion in sealed engagement with the inner member, an outer portion in sealed engagement with the first member, and a flexible wall connecting the outer portion to the inner portion and permitting relative movement between the outer portion and the inner portion in at least a first direction; and a second member operatively associated with the first member, wherein the second member directly engages at least a portion of a surface of the outer portion to substantially prevent movement of the outer portion of the seal member in the first direction.

9. The seal assembly of claim 8, wherein the first member comprises a canister and the second member comprises a lid.

10. The seal assembly of claim 8, wherein the inner member comprises a shaft and the outer member comprises a member selected from the group consisting of a housing or a yoke.

11. A seal assembly as defined in claim 8, wherein:
said outer portion of said seal member includes an annular seal extending radially therefrom and engaging an interior surface of said first member.

12. A seal assembly as defined in claim 11, wherein:
said annular seal extends at an angle generally toward said intermediate portion.

13. A seal assembly as defined in claim 8, wherein:
said inner portion of said seal member defines an inner radial surface including at least one annular ridge formed thereon.

14. A seal assembly as defined in claim 8, wherein:
said outer portion of said seal member defines a bearing portion formed annularly around said outer portion.

15. A seal assembly as defined in claim 14, wherein:
said bearing portion may be in engagement with at least a portion of an inner surface of said first member.

16. A seal assembly as defined in claim 8, wherein:
said inner portion of said seal member moves together with said inner member and moves relative to said first member.

17. A method of forming a seal between radially spaced inner and outer members comprising:
providing a seal assembly including a seal member comprising an inner portion configured to form a seal with the inner member, an outer portion in sealed engagement with a first member, and an intermediate portion connecting the outer portion to the inner portion and permitting relative movement between the outer portion and the inner portion in a first direction, and a second member operatively associated with the first member, wherein the second member directly engages at least a portion of a surface of the outer portion to substantially prevent movement of the outer portion of the seal member relative to the first and second members in the first direction when the first member is operatively associated with the second member; and
operatively associating the seal assembly with the inner and outer members.

18. The method of claim 17, wherein the first member comprises a canister and the second member comprises a lid.

19. The method of claim 18, wherein the canister includes a first flange extending radially inward from a sidewall.

20. The method of claim 19, wherein:
the outer portion of the seal member includes a main body connected to a wiper section; and
the wiper section is in sealed engagement with the first flange.

21. The method of claim 18, wherein the seal member may rotate within the canister.

22. The method of claim 17, wherein the inner member comprises a shaft and the outer member comprises a housing.

23. The method of claim 17, wherein the intermediate portion of the seal member comprises a flexible wall.

24. The method of claim 23, wherein the flexible wall may roll in the first direction.

25. A seal assembly for radially spaced inner and outer members comprising:
a canister;
a seal member including an inner portion having no rigid structure and having an inner diameter, said inner portion configured to expand around and form a seal with the inner member, an outer portion in sealed engagement with the canister, and an intermediate portion connecting the outer portion to the inner portion and permitting relative movement between the outer portion and the inner portion in at least a first direction; and
a lid operatively associated with the canister, wherein the lid directly engages at least a portion of a surface of the outer portion to substantially prevent movement of the outer portion of the seal member relative to the canister and the lid in the first direction when the canister is operatively associated with the lid.

26. A seal assembly as defined in claim 25, wherein:
said inner portion includes an outer diameter, and further wherein said outer diameter expands upon said inner portion receiving said inner member.

27. A seal assembly for radially spaced inner and outer members comprising:
a first member for operative association with the outer member;
a seal member including an inner portion having no rigid structure and having an inner diameter, said inner portion configured to expand around and form a seal with the inner member in sealed engagement with the inner member, an outer portion in sealed engagement with the first member, and a flexible wall connecting the outer portion to the inner portion and permitting relative movement between the outer portion and the inner portion in at least a first direction; and
a second member operatively associated with the first member, wherein the second member directly engages at least a portion of a surface of the outer portion to substantially prevent movement of the outer portion of the seal member in the first direction.

28. A seal assembly as defined in claim 27, wherein:
said inner portion includes an outer diameter, and further wherein said outer diameter expands upon said inner portion receiving said inner member.

29. A seal assembly for radially spaced inner and outer members comprising:
a canister including an axial wall and a flange extending radially inward from the axial wall;
a seal member including an inner portion configured to form a seal with the inner member, an outer portion in sealed engagement with at least the axial wall and the flange of the canister, and a flexible, arch-shaped wall connecting the outer portion to the inner portion and permitting relative movement between the outer portion and the inner portion in at least a first direction;
the outer portion includes a surface distal the flange of the canister; and
a lid operatively associated with the canister, wherein the lid directly engages the surface of the outer portion to substantially prevent movement of the outer portion of the seal member relative to the canister and the lid in the first direction when the canister is operatively associated with the lid.

30. A seal assembly for radially spaced inner and outer members comprising:

a first member including an axial wall and a flange extending radially inward from the axial wall;

a seal member including an inner portion configured to form a seal with the inner member, an outer portion in sealed engagement with at least the axial wall and the flange of the first member, and a flexible, arch-shaped wall connecting the outer portion to the inner portion and permitting relative movement between the outer portion and the inner portion in at least a first direction;

the outer portion includes a surface distal the flange of the first member; and a second member operatively associated with the first member, wherein the second member directly engages the surface of the outer portion to substantially prevent movement of the outer portion of the seal member relative to the first member and the second member.

31. A seal assembly for radially spaced inner and outer members comprising:

a canister;

a seal member including an inner portion having no rigid structure and having an inner diameter, said inner portion configured to expand around and form a seal with the inner member, an outer portion in sealed engagement with the canister, an intermediate portion connecting the outer portion to the inner portion and permitting relative movement between the outer portion and the inner portion in at least a first direction, the inner, intermediate, and outer portions comprise an elastomeric material, and no portion of the seal member contains a structure that is more rigid than the elastomeric material; and a lid operatively associated with the canister, wherein the lid directly engages at least a portion of a surface of the outer portion to substantially prevent movement of the outer portion of the seal member relative to the canister and the lid in the first direction when the canister is operatively associated with the lid.

32. A seal assembly for radially spaced inner and outer members comprising:

a first member for operative association with the outer member;

a seal member including an inner portion having no rigid structure and having an inner diameter, said inner portion configured to expand around and form a seal with the inner member in sealed engagement with the inner member, an outer portion in sealed engagement with the first member, a flexible wall connecting the outer portion to the inner portion and permitting relative movement between the outer portion and the inner portion in at least a first direction, the inner and outer portions comprise an elastomeric material, and no portion of the seal member contains a structure that is more rigid than the elastomeric material; and a second member operatively associated with the first member, wherein the second member directly engages at least a portion of a surface of the outer portion to substantially prevent movement of the outer portion of the seal member in the first direction.

* * * * *